US009734132B1

United States Patent
Kothandapani Shanmugasundaram et al.

(10) Patent No.: US 9,734,132 B1
(45) Date of Patent: Aug. 15, 2017

(54) ALIGNMENT AND REFLOW OF DISPLAYED CHARACTER IMAGES

(75) Inventors: Satishkumar Kothandapani Shanmugasundaram, Chennai (IN); Viswanath Sankaranarayanan, Tamil Nadu (IN)

(73) Assignee: Amazon Technologies, Inc., Seattle, WA (US)

(*) Notice: Subject to any disclaimer, the term of this patent is extended or adjusted under 35 U.S.C. 154(b) by 736 days.

(21) Appl. No.: 13/332,088

(22) Filed: Dec. 20, 2011

(51) Int. Cl.
*G06F 17/00* (2006.01)
*G06F 17/21* (2006.01)
(Continued)

(52) U.S. Cl.
CPC .......... *G06F 17/211* (2013.01); *G06F 17/214* (2013.01); *G06F 17/30905* (2013.01); *G06F 17/2223* (2013.01); *G06K 9/00463* (2013.01); *G06K 2209/011* (2013.01); *G06K 2209/013* (2013.01)

(58) Field of Classification Search
CPC ...... G06F 17/211; G06F 17/214; G06F 17/25; G06F 17/212; G06F 17/21; G06F 17/2294; G06F 17/2863; G06F 17/26; G06F 17/30905; G06F 17/2223; G06K 9/00463; G06K 9/348; G06K 9/00456; G06K 9/00449; G06K 9/6828; G06K 2215/0068; G06K 2009/00489; G06K 2009/013; G06K 2209/011; G06K 2009/011; G06K 2209/013
USPC ....... 715/201, 210, 238, 243, 244–245, 247, 715/253, 255–256, 258, 262, 273, 815, 715/864; 382/168, 171, 177–179, 382/185–187, 298; 345/468, 472; 358/1.11
See application file for complete search history.

(56) References Cited

U.S. PATENT DOCUMENTS

| 3,311,016 A | * | 3/1967 | Kindersley | ............... B41B 1/02 356/433 |
| 4,173,015 A | * | 10/1979 | Owens | ..................... G06K 9/34 382/178 |

(Continued)

OTHER PUBLICATIONS

Breuel, T.M.,"Reflowable Document Images for the Web," In Proc. WDA 2003, the 2nd International Workshop on Web Document Analysis, (2003), pp. 21-24.*

(Continued)

*Primary Examiner* — Cesar Paula
*Assistant Examiner* — James H Blackwell
(74) *Attorney, Agent, or Firm* — Lee & Hayes, PLLC

(57) ABSTRACT

Determination of an underlying grid structure that facilitates layout of East Asian text is disclosed. The underlying grid structure includes both a size of character frames and a size of a text block frame. The East Asian text may be obtained from a scan of printed material that has the text formatted according to layout conventions established by the publisher. The text may be reformatted to appear on a display of an electronic device in a manner similar to the formatting in the original scanned document. Reformatting may include reflowing the text in order to fit a greater or lesser number of characters on a line. The reflowing may maintain character spacing from the original document and follow formatting rules against locating certain characters at the start or end of a line.

19 Claims, 13 Drawing Sheets

(51) Int. Cl.
*G06F 17/30* (2006.01)
*G06F 17/22* (2006.01)
*G06K 9/00* (2006.01)

(56) References Cited

U.S. PATENT DOCUMENTS

| | | | | |
|---|---|---|---|---|
| 4,228,507 A * | 10/1980 | Leban | ................... | G06F 3/018 345/467 |
| 4,291,381 A * | 9/1981 | Siebeck | ................. | B41B 27/28 396/552 |
| 4,440,513 A * | 4/1984 | Kataoka | .................. | G06F 3/018 345/173 |
| 4,562,594 A * | 12/1985 | Bednar | .................. | G06K 9/348 382/174 |
| 4,783,760 A * | 11/1988 | Carosso | .................. | G06F 17/25 400/3 |
| 4,833,627 A * | 5/1989 | Leszczynski | ........... | B41B 19/01 345/471 |
| 4,887,301 A * | 12/1989 | Hodgens | .................. | G06K 9/34 382/178 |
| 4,937,745 A * | 6/1990 | Carmon | .................. | G06F 3/018 400/110 |
| 4,946,299 A * | 8/1990 | Shimada | .................. | B41J 25/24 400/279 |
| 4,980,840 A * | 12/1990 | Yin | ....................... | G06F 17/215 345/467 |
| 4,989,257 A * | 1/1991 | Horowitz | ..................... | 382/192 |
| 4,995,738 A * | 2/1991 | Shibaoka | ................ | G06F 17/26 400/7 |
| 5,105,381 A * | 4/1992 | Takahashi et al. | ........... | 715/210 |
| 5,111,514 A * | 5/1992 | Ohta | .................. | H04N 1/40093 382/177 |
| 5,167,017 A * | 11/1992 | Sasaki | ................... | G06F 17/211 715/210 |
| 5,214,717 A | 5/1993 | Kimura et al. | | |
| 5,224,038 A * | 6/1993 | Bespalko | ..................... | 715/234 |
| 5,243,668 A * | 9/1993 | Kitamura | ............ | G06K 9/3283 358/465 |
| 5,375,176 A * | 12/1994 | Spitz | ................ | 382/228 |
| 5,416,898 A * | 5/1995 | Opstad | ................ | G06F 17/214 345/468 |
| 5,432,890 A * | 7/1995 | Watanabe | .............. | G06K 15/02 345/467 |
| 5,467,447 A * | 11/1995 | Vogel | ................... | G03G 21/04 715/235 |
| 5,501,538 A * | 3/1996 | Sawada et al. | ............... | 400/304 |
| 5,513,304 A * | 4/1996 | Spitz | ..................... | G06K 9/348 382/295 |
| 5,548,700 A * | 8/1996 | Bagley et al. | ................ | 715/255 |
| 5,560,037 A * | 9/1996 | Kaplan | ......................... | 715/201 |
| 5,581,633 A * | 12/1996 | Hotta et al. | .................. | 382/174 |
| 5,590,257 A * | 12/1996 | Forcier | ..................... | 715/273 |
| 5,623,593 A * | 4/1997 | Spells, III | .............. | G06K 15/02 345/472 |
| 5,668,891 A * | 9/1997 | Fan et al. | .................... | 382/168 |
| 5,724,596 A * | 3/1998 | Lathrop | ................ | G06F 17/214 715/244 |
| 5,734,761 A * | 3/1998 | Bagley | ........................... | 382/309 |
| 5,740,356 A * | 4/1998 | Liang | ................... | G06F 11/1008 369/119 |
| 5,740,456 A * | 4/1998 | Harel | .................... | G06T 11/203 345/469 |
| 5,754,873 A * | 5/1998 | Nolan | .................. | G06F 3/0481 345/472 |
| 5,778,403 A * | 7/1998 | Bangs | ................... | G06F 17/21 715/210 |
| 5,802,532 A * | 9/1998 | Nakayama | ............ | G06T 11/203 345/467 |
| 5,803,629 A * | 9/1998 | Neville et al. | ................ | 400/304 |
| 5,832,531 A * | 11/1998 | Ayers | .................... | 715/209 |
| 5,835,921 A * | 11/1998 | Sunakawa et al. | ........... | 715/201 |
| 5,883,974 A * | 3/1999 | Fan | ....................... | G06K 9/6828 382/170 |
| 5,900,004 A * | 5/1999 | Gipson | .................. | G06F 17/21 715/236 |
| 5,953,735 A * | 9/1999 | Forcier | ................. | G06F 3/0488 715/273 |
| 6,321,243 B1 * | 11/2001 | Ballard | ........................ | 715/202 |
| 6,438,509 B1 * | 8/2002 | Hayama | ................ | B41J 3/4075 400/3 |
| 6,456,738 B1 * | 9/2002 | Tsukasa | ........................ | 382/175 |
| 6,473,523 B1 * | 10/2002 | Newman | ............. | G06K 9/2054 348/333.12 |
| 6,510,441 B1 * | 1/2003 | Kenninga | ............ | G06F 17/211 715/234 |
| 6,532,303 B2 * | 3/2003 | Saiga | ................. | G06K 9/3208 358/488 |
| 6,539,117 B2 * | 3/2003 | Carau, Sr. | ............. | G06F 17/212 358/462 |
| 6,624,828 B1 * | 9/2003 | Dresevic | ............... | G06F 1/1607 345/594 |
| 6,657,738 B1 * | 12/2003 | Watanabe et al. | ........... | 358/1.11 |
| 6,668,355 B1 * | 12/2003 | Shiratori | ..................... | 715/201 |
| 6,687,876 B1 * | 2/2004 | Schilit | ................... | G06F 17/241 715/231 |
| 6,707,571 B1 * | 3/2004 | Kurashina | .................... | 358/1.18 |
| 6,751,779 B1 * | 6/2004 | Kurosawa et al. | ........... | 715/209 |
| 6,845,488 B1 * | 1/2005 | Shim et al. | .................... | 715/815 |
| 6,928,611 B2 * | 8/2005 | McCully | ............... | G06F 17/211 715/245 |
| 6,981,209 B1 * | 12/2005 | Parikh et al. | ................. | 715/212 |
| 7,123,261 B2 * | 10/2006 | McCully | ............. | G06F 17/2863 345/471 |
| 7,168,037 B2 * | 1/2007 | Shade | ................... | G06F 17/211 715/244 |
| 7,177,488 B2 * | 2/2007 | Berkner | ................. | G06T 11/60 345/619 |
| 7,197,695 B2 * | 3/2007 | Williamson et al. | ......... | 715/251 |
| 7,205,985 B2 * | 4/2007 | Dodge et al. | ................. | 345/179 |
| 7,259,753 B2 * | 8/2007 | Keely | ................... | G06F 17/211 345/179 |
| 7,301,672 B2 * | 11/2007 | Abe et al. | ...................... | 358/1.9 |
| 7,305,617 B2 * | 12/2007 | McCully | ................ | G06F 17/214 345/672 |
| 7,320,104 B2 * | 1/2008 | Lynn | ....................... | G06F 17/24 715/243 |
| 7,362,902 B1 * | 4/2008 | Baker et al. | .................... | 382/229 |
| 7,424,672 B2 * | 9/2008 | Simske et al. | ................. | 715/243 |
| 7,444,586 B1 * | 10/2008 | Wormley | ............... | G06F 17/211 715/245 |
| 7,457,464 B2 * | 11/2008 | Stevens et al. | ................ | 382/181 |
| 7,469,063 B2 * | 12/2008 | Koyama | ............ | G06K 9/00456 358/474 |
| 7,543,230 B2 * | 6/2009 | Tamaru | .................. | G06F 17/211 715/243 |
| 7,565,603 B1 * | 7/2009 | Jones | ................... | G06F 17/211 707/999.102 |
| 7,616,815 B2 * | 11/2009 | Berkner | ................. | G06T 11/60 382/176 |
| 8,041,119 B2 | 10/2011 | Tsai et al. | | |
| 8,136,034 B2 * | 3/2012 | Stanton et al. | ................ | 715/255 |
| 8,160,402 B2 * | 4/2012 | Wu et al. | ...................... | 382/309 |
| 8,209,600 B1 * | 6/2012 | Koh et al. | ................. | 715/244 |
| 8,218,875 B2 * | 7/2012 | Al-Omari et al. | ............ | 382/185 |
| 8,225,200 B2 * | 7/2012 | Nakatsuka | .................... | 715/245 |
| 8,234,567 B2 * | 7/2012 | Tamaru | .................. | G06F 17/211 715/243 |
| 8,245,130 B1 * | 8/2012 | Lloyd | ................. | G06F 17/30905 715/234 |
| 8,458,583 B2 * | 6/2013 | Kutsumi et al. | ............... | 715/232 |
| 8,539,349 B1 * | 9/2013 | Kirshenbaum | ......... | G06F 17/27 704/10 |
| 8,542,926 B2 * | 9/2013 | Panjwani et al. | ............. | 382/176 |
| 8,645,124 B2 * | 2/2014 | Karov Zangvil | ..... | G06F 17/273 704/1 |
| 2002/0062324 A1 * | 5/2002 | McCully et al. | ............. | 707/517 |
| 2003/0055851 A1 * | 3/2003 | Williamson et al. | ......... | 707/515 |
| 2003/0086611 A1 * | 5/2003 | Loudon | ................. | G06K 9/342 382/186 |
| 2003/0123730 A1 * | 7/2003 | Kim et al. | .................... | 382/177 |

(56) References Cited

U.S. PATENT DOCUMENTS

| | | | | |
|---|---|---|---|---|
| 2004/0125107 A1* | 7/2004 | McCully | ............. | G06F 17/2863 345/472 |
| 2004/0160443 A1* | 8/2004 | Beaman | ................ | G06T 11/203 345/467 |
| 2004/0202352 A1* | 10/2004 | Jones et al. | .................... | 382/114 |
| 2004/0205568 A1* | 10/2004 | Breuel et al. | ................. | 715/513 |
| 2004/0240738 A1* | 12/2004 | Nakajima | ..................... | 382/185 |
| 2004/0268255 A1* | 12/2004 | McCully | ....................... | 715/531 |
| 2005/0177786 A1* | 8/2005 | Shade | ................... | G06F 17/211 715/244 |
| 2006/0236237 A1* | 10/2006 | Peiro | ..................... | G06F 17/211 715/203 |
| 2007/0189628 A1* | 8/2007 | Nolan | ...................... | G06K 9/72 382/254 |
| 2007/0234203 A1* | 10/2007 | Shagam et al. | ............... | 715/517 |
| 2007/0294644 A1* | 12/2007 | Yost | .................... | G06F 3/04812 715/856 |
| 2008/0040655 A1* | 2/2008 | Tanaka | .......................... | 715/228 |
| 2008/0082913 A1* | 4/2008 | Lloyd | ..................... | G09G 5/26 715/246 |
| 2008/0317341 A1* | 12/2008 | Speigle | ............... | G06K 9/3208 382/170 |
| 2009/0226089 A1* | 9/2009 | Ozawa et al. | ................ | 382/185 |
| 2010/0037186 A1* | 2/2010 | Craig | ...................... | G06F 17/30 715/864 |
| 2010/0073735 A1* | 3/2010 | Hunt | ...................... | G06T 3/0031 358/462 |
| 2010/0107061 A1* | 4/2010 | Ramakrishnan | ...... | G06F 17/212 715/256 |
| 2010/0174978 A1* | 7/2010 | Mansfield et al. | ............ | 715/234 |
| 2010/0174985 A1* | 7/2010 | Levy | ..................... | G06F 17/211 715/244 |
| 2011/0044539 A1* | 2/2011 | Kimura et al. | ............... | 382/165 |
| 2011/0090253 A1* | 4/2011 | Good | ..................... | G06F 17/289 345/633 |
| 2011/0173532 A1* | 7/2011 | Forman et al. | ............... | 715/256 |
| 2011/0188753 A1* | 8/2011 | Wada | ....................... | G06K 9/34 382/176 |
| 2011/0199627 A1* | 8/2011 | Tzadok | ......................... | 358/1.11 |
| 2011/0252302 A1* | 10/2011 | Yalovsky | .......... | G06F 17/30905 715/234 |
| 2011/0289395 A1* | 11/2011 | Breuel | ............... | G06K 9/00463 715/205 |
| 2011/0320938 A1* | 12/2011 | Schorsch | .................. | G06T 3/40 715/269 |
| 2012/0288190 A1* | 11/2012 | Tang | ............................. | 382/165 |
| 2012/0311487 A1* | 12/2012 | Staikos | .................. | G06F 3/048 715/800 |
| 2013/0124979 A1* | 5/2013 | Chang et al. | ................. | 715/243 |
| 2014/0006982 A1* | 1/2014 | Wabyick | ............... | G06F 17/212 715/763 |

OTHER PUBLICATIONS

Pajjwani, S. et al.,"Script-Agnotic Reflow of Text in Document Images," MobileHCI 2011, Aug. 30-Sep. 2, 2011, Stlockhom, Sweden, 4 pages.*

Breuel, T.M. et al., "Paper to PDA," © 2002, IEEE, pp. 476-479.*

Microsoft, "East Asian Text Formatting Features in Office 10," © Mar. 30, 2010, 4 pages.*

Okumura, H., "pTeX and Japanese Typesetting," © Apr. 2008, Asian Journal of TeX, pp. 43-51.*

Becker Z. et al.,"triroff, an adaptation of the device-independent troff for formatting tri-directional text," © Oct. 1989, Electronic Publishing, vol. 2(3), pp. 119-142.*

Kishi, N. et al.,"Preprocess for Text Formatting," Jan. 1, 1990, IP.com, pp. 280-282.*

Fang, J. et al.,"Reflowing-driven paragraph recognition for electronic books in PDF," © 2001, Proc. SPIE, 9 pages.*

Liu, Z. et al.,"Semi-supervised learning for text-line detection," © 2010, Elsevier, pp. 1260-1273.*

Kammle, Bodo,"Font Technology, Chapter 9 Letter Spacing," © Springer-Verlag Berlin Heidelberg 1994, pp. 173-192.*

Kopec, G.E.,"Least-Squares Font Metric Estimation from Images," © 1993, IEEE, pp. 510-519.*

"Requirements for Japanese Text Layout", W3C Working Group Note Jun. 4, 2009, retrieved on Sep. 22, 2011 at <<http://www.w3.org/TR/jlreq/>>, 221 pages.

"Typical Examples of Kihonhanmen", Japanese Layout Taskforce, Appendix 1, Oct. 25, 2007, 22 pages.

* cited by examiner

REFLOW WITHOUT ADJUSTING
NON LINE-STARTERS AND
NON LINE-ENDERS
600

REFLOW ADJUSTING FOR NON LINE-
STARTERS AND NON LINE-ENDERS
602

FIG. 6

ALIGNMENT AND REFLOW OF DISPLAYED CHARACTER IMAGES

BACKGROUND

Content is increasingly being distributed in electronic form to an array of users for use on computing devices. Content may include traditional media such as books, magazines, newspapers, newsletters, manuals, guides, references, articles, reports, and documents. The content may exist in print and/or in electronic form, or may be transformed from print to an electronic form through the use of a scanning device. The Internet, in particular, has facilitated a wide publication of digital content through downloading and displaying of images of content. Additionally, as more content is transformed from print to electronic form, more images of content are becoming available online. In some instances, a page image allows a reader to view a page of content as it would appear in print.

Some users may have computing devices with displays that are sized differently from the display for which an image is originally formatted. Also, some users may wish to view the content in an image in a varyingly-sized window within a display. To accommodate these different viewing preferences, content providers have developed techniques for reformatting images of text to display appropriately at different sizes. However, many of these approaches are designed for English or other Western languages.

East Asian languages such as Japanese, Korean, and Chinese are more complex than many Western languages. East Asian languages may have different character classes including logograms, multiple writing modes (i.e., vertical and horizontal), and numerous text layout rules that specify formatting and composition of text. Publishers of physical books may use sophisticated page-layout software to address these various rules and format pages of text in a book (or other printed material) to provide a good reading experience. However, these layout techniques are designed primarily to format text for a printed page and are poorly adapted for reformatting text to display on varyingly-sized windows of electronic devices.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 illustrates adjustment of text layout to properly position some characters that cannot appear at the start of a line and to position other characters that cannot appear at the end of a line.

DETAILED DESCRIPTION

Overview

Figure 1:
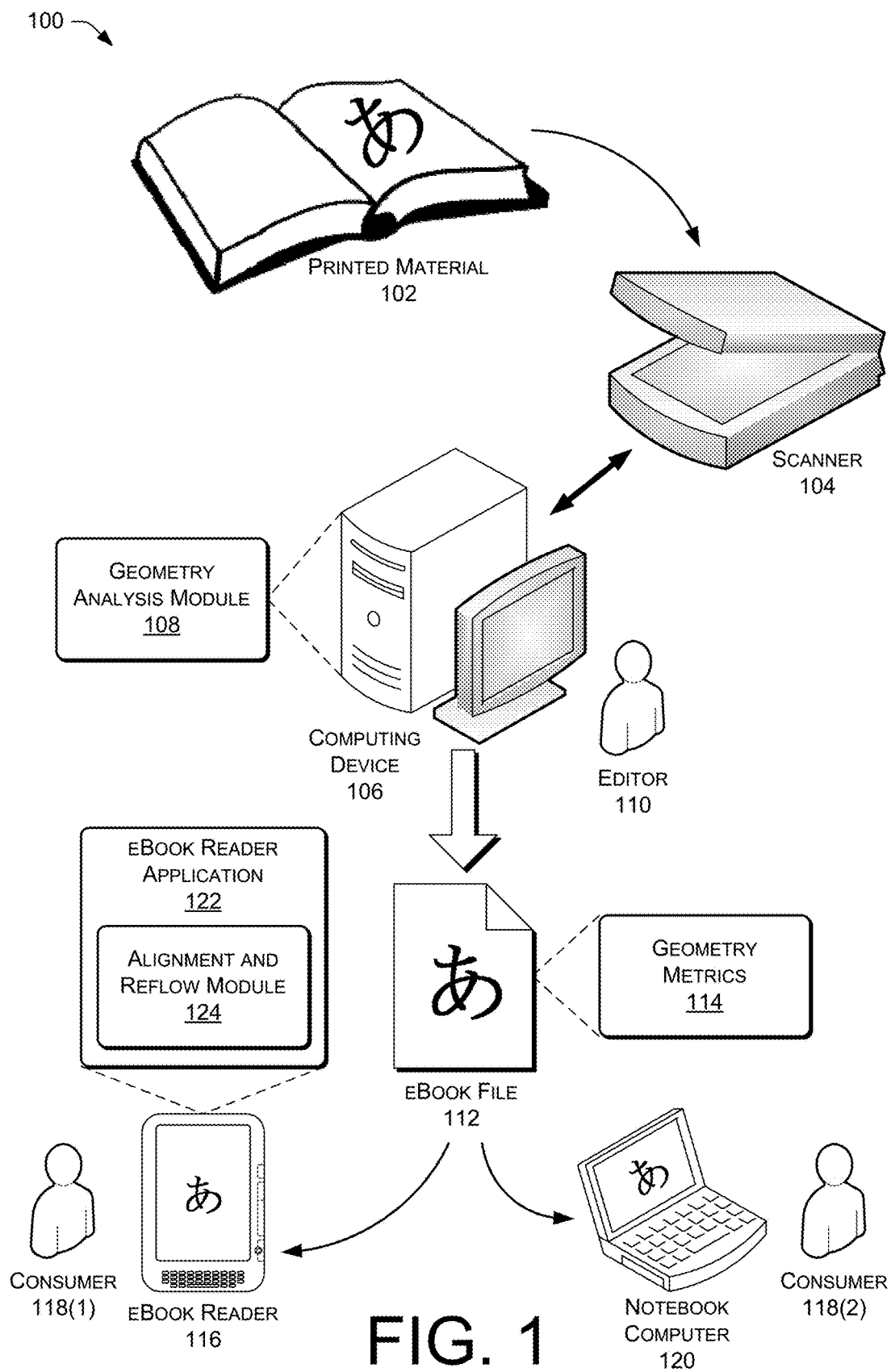
FIG. 1 is an example architecture for adapting printed material for display on electronic devices.

The disclosure is directed to a computer-implemented method, system, and computer-readable medium having instructions encoded thereon, for generating an image-based file of East Asian scripts such as Japanese kanji, Japanese hiragana, Japanese katakana, Korean Hangul, Korean Hanja, Traditional Chinese, Simplified Chinese, and other types of logograms (e.g., pictograms, ideograms, graphical characters, etc.). For the sake of convenience, the varieties of marks that may represent types of East Asian scripts are referred to herein as "text." The image-based file generates the text in a manner that maintains the original formatting and layout, but allows for reflowing the text to accommodate different display areas. Static page images can accurately reproduce the text on a printed page exactly as it originally appeared. However, a static page image, essentially a photograph of a page of text, may be inconvenient for a consumer to view on an electronic display particularly if scrolling is necessary to see the entire page image. Conversely, if the page image is much smaller than the electronic display screen real estate is wasted. Performing optical character recognition on a page of text to create a fully editable soft copy of a printed page may create text that can be readily arranged to fit on an electronic display. However, by converting printed characters into a computer font, the final product displayed to the consumer may lack the distinctive font, layout, and "look and feel" of the original document. Furthermore, characters that do not correspond to one of the characters in the computer font cannot be displayed when the character set is limited to only those characters in the set of characters that make up the computer font. Moreover, optical character recognition (OCR) conversion may be less than 100 percent accurate. Creating an electronic book ("eBook") from printed material in any language may need significant amounts of manual modification before it is ready for consumer consumption. This disclosure presents techniques for inferring layout and formatting characteristics from the geometry of a page of East Asian text and applying those characteristics so that the text may be reformatted for an electronic display while maintaining the look and feel of the original printed document.

Japanese text, for example, is laid out according to a series of complex and interrelated rules. A description of conventional Japanese layout rules may be found in the "Requirements for Japanese Text Layout: W3C Working Group Note 4 Jun. 2009" which is available at http://www.w3.org/TR/2009/NOTE-jlreq-20090604 and is incorporated by reference herein. In brief, Japanese text is laid out according to a grid in which individual cells of the grid are squares and full-width characters occupy an entire square while half-width characters occupy half a square. One of these squares, or similar areas for characters, is referred to herein as a "character frame." The main area of text on a printed page of Japanese is bounded by a rectangular frame that, although the frame itself is not printed, is used to separate the main text from other text such as hanging punctuation, page numbers, running headers, etc. That rectangular frame is referred to herein as a "text block frame."

Although the basic layout for Japanese text consists of a relatively simple rectangular grid of squares, there are numerous exceptions to the basic grid format to accommodate half-width characters, Western language characters, or for other reasons. Additionally, different types of publications (e.g., newspapers as compared to books) may follow different layout conventions and even individual publishers may layout the same type of document (e.g., two books from different publishing houses) according to slightly different rules and conventions. Although a reader may recognize that a newspaper looks like a newspaper and a book looks like a book, he or she may not be aware of the specific layout rules used to layout the text for printing the newspaper or book. In fact, many of the rules may be difficult to reverse engineer simply from examination of a printed document. However, analysis of the geometric layout of the text itself combined with statistical techniques makes it possible to infer "geometric" layout rules that allow for a reasonably close approximation of the original publishing layout.

A captured image of multiple characters or words image from the printed text can preserve exactly the original layout. However, distributing the words in characters across a display screen may require breaking a line of text where there was no line break in the original or joining two characters that were split across adjacent lines of text in the original document. Thus, "reflowing" text according to the dimensions and limitations of an electronic display requires some level of modification of the text that goes beyond simple reproduction of images captured from a printed version of the text. Additionally, in contrast to traditional typesetting, reflowing may occur on the fly as a consumer adjusts a window size or zoom level.

For the purposes of discussion, the character frame and text block frame detection techniques as well as the text layout and reflow techniques are described as applied to Japanese text. However, this is but one example and these techniques may be applied with little or no modification to other East Asian languages such as Chinese or Korean. Moreover, the examples of Japanese text shown in the accompanying figures are vertical text, but the content of this disclosure applies equally to horizontal text merely by changing "top" to "left", "vertical" distance to "horizontal" distance, and the like.

Illustrative Architecture

FIG. 1 is a pictorial diagram showing an illustrative architecture 100, in which printed text, in particular text of East Asian languages, is adapted for rendering on electronic displays while maintaining the formatting and layout of the text as originally printed. Printed material 102 contains the text as published. The printed material 102 may be a book, magazine, newspaper, or other physical object. Alternatively, the printed material 102 may be an electronic file that contains a representation of the text as it would be presented on a physical page. For example, the printed material 102 may be represented as a picture or page image such as, for example, a tagged image file format (TIFF) file, a JPEG file, or a portable document format (PDF) file.

In implementations in which the printed material 102 is a physical object such as a book, a scanner 104 may generate a scan (e.g., an image data file and/or other data files) from the printed material 102. The scanner 104 may be any device capable of capturing images including but not limited to a video camera, scanner, digital camera, copier, scanning pen, etc. The scanner 104 may include a coordinate system defined by the hardware of the scanner 104 that consists of numeric values for horizontal and vertical distances from a reference location on the scanner bed such as the top left corner. Thus, the scanner 104 may assign horizontal and vertical positions to images detected by the scanner 104 and the locations of images may be described in reference to arbitrary baselines such as the top edge or left edge of the scanner bed.

Scans generated by the scanner 104 may be image-based files of pages of the printed material 102. The image-based representation may capture characters from the printed material 102 simply as images rather than as specific characters or letters of a particular language. These scans may be received by a computing device 106 for additional analysis and processing. In implementations in which the printed material 102 is an electronic file, the electronic file may be received by the computing device 106 directly without use of the scanner 104. In either implementation, the computing device 106 receives an electronic representation of text as it is intended to appear on a printed page.

The computing device 106 may be any type a computing device such as a desktop computer system, a server, a supercomputer, a notebook computer, a tablet computer, an eBook reader, a smart phone, and the like. The computing device 106 may include a geometry analysis module 108 for analyzing geometric features of the text. The geometric features may include character layout, margins, and the like. An editor 110 may interact with the computing device 106 to modify analysis and formatting performed automatically by the geometry analysis module 108.

The computing device 106 may generate an eBook file 112 that captures the appearance, spacing, layout, and other aspects of the text as the text appeared in the printed material 102 while still allowing the text to be reflowed and adjusted for display on different sizes of displays, different window sizes, and at different levels of magnification or zoom. The eBook file 112 may include geometry metrics 114 derived by the geometry analysis module 108. The geometry metrics 114 may include the font, spacing, layout, and other aspects of the text. Although referred to as an eBook file 112, the output from the computing device 106 may contain text from any type of source document including but not limited to books.

The eBook file 112 may be rendered on any number of display devices, such as a display screen of an eBook reader 116 from which the text may be consumed in electronic form by a consumer 118(1). The same eBook file 112 may be rendered differently due to differing screen sizes or levels of zoom on another computing device such as, for example, a notebook computer 120 that displays the text for consumption by a consumer 118(2). The display devices incorporated into the eBook reader 116, the notebook computer 120, or other device that renders the eBook file 112 may be any type of typical display device such as a liquid crystal display, a cathode ray tube display, a bi-stable display (e.g., electronic ink), or the like. Devices 116 and 120 may render the eBook file 112 by using an eBook reader application 122. The eBook reader application 122 may include an alignment and reflow module 124. The alignment and reflow module 124 may process the text so that the text is capable of being arranged in different layouts according to the size of the electronic display on the device in which the eBook reader application 112 is operating.

Character Frame Size

The character frame is a border or box that the character fits within. Character frames are similar to the constant width spacing of monospaced Western text. The character frame size may be used as a starting point to determine many other aspects of text layout. For example, if the character frame size is known, the space occupied by a full-width character is a square with a length of each edge equal to the size of the character frame. A half-width character occupies a rectangle half the size of a full-width character. The height of a text block frame may be determined by multiplying the number of full-width characters in a line by the character frame size. However, the frames used to layout individual characters are not printed, and thus, the character frame size is difficult to observe directly from printed material 102.

Figure 2:
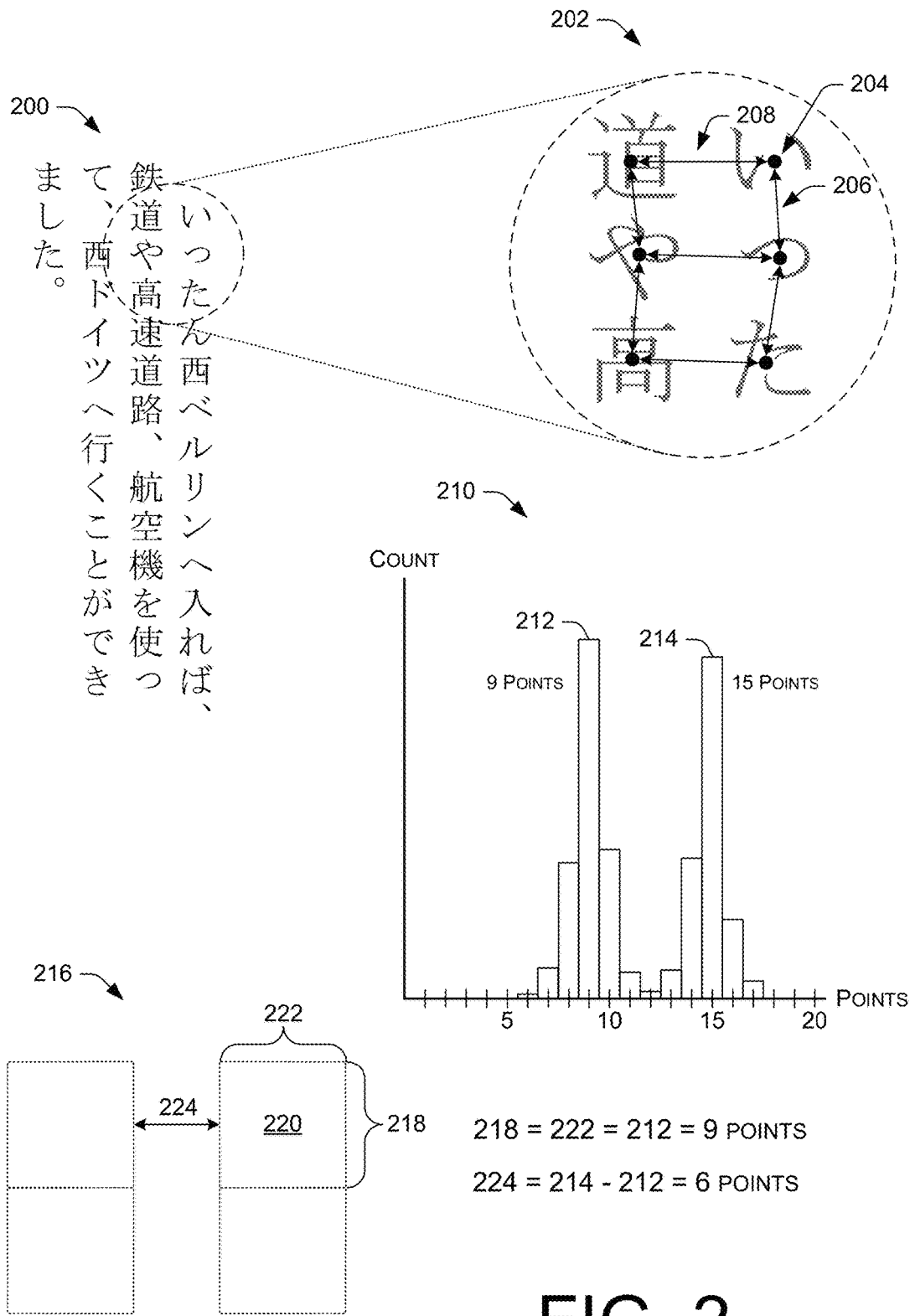
FIG. 2 illustrates an example technique for identifying character frame size and line gap size of text.

FIG. 2 illustrates a technique for determining character frame size and line gap spacing from text. Here, a scan 200 of Japanese text is analyzed to find distances between the characters. The enlargement 202 shows a center 204 of a character indicated by a black dot. The center 204 may be determined by identifying a geometric center for the marks representing the character. In print format, the marks may correspond to the ink used to print the character. Identification of the geometric center may be achieved by conventional machine vision techniques.

A center 204 may be determined for most or all of the characters in the scan 200. Distances between centers of characters and adjacent characters are determined using geometry. Vertical distances 206 and horizontal distances 208 between a character and that character's nearest vertical or horizontal neighbors may be determined. Vertical distances 206 and horizontal distances 208 may be determined, in some implementations, by calculating y-coordinate offsets and x-coordinate offsets respectively. In this example, the text of the scan 200 is vertical text so the line gap runs vertically and makes the typical horizontal distance 208 larger than the typical vertical distance 206. Each character in the original printed matter 102 is assumed to be set within the same sized character frame. However, some characters are laid out differently such as half-width characters that are situated within a half-width character frame. Application of this technique may enable reverse engineering of the full-width, standard character frame size from a representative value or values for the vertical distances 206 and the horizontal distances 208 between character centers in a scan 200.

Different characters have different shapes and therefore the centers 204 may not be uniformly distributed. Identifying the distances between character centers 204 for multiple characters will produce a range of values. The centers of some characters, such as a comma, are far from the center of a character frame surrounding the comma. Therefore simply placing character frames centered around the respective character centers would not lead to uniform distribution of character frames set solid as in typical Japanese publishing or other East Asian publishing of graphical characters.

Histogram 210 shows one technique for excluding the influence of outlying values (i.e., very large or very small distances between centers 204). In this example, the true size of the character frame is nine points and the line gap is six points (both typical for Japanese text). When the various distances between character centers are plotted on the histogram 210, two peaks emerge: one at nine points and one at 15 points. In this example the size of each bin in the histogram is one point and every measurement from half a point below to half a point above grouped into the same bin (e.g., distances from 8.50 point to 9.49 point are grouped in the 9-point bin).

The histogram 210 may provide evidence of the most probable grid size. The tallest bar of the histogram—the bin with the most samples in it, may be selected as the character frame size. Here, that is represented by column 212 that corresponds to a distance of nine points providing a correct determination for the character frame size. The second peak in this example at 15 points shown by column 214 represents the distances between characters that include the additional six point line gap. Identifying that horizontal distances are clustered around column 214 (e.g., corresponding to the longer distance) and that vertical distances are clustered around column 212 (e.g., corresponding to the shorter distance) also identifies the scan 200 as a scan of vertical text.

Kernel density estimation is in another technique that may be used to exclude the influence of outlying values. Kernel density estimation is a non-parametric way of estimating a probability density function of a random variable. In contrast to histograms, kernel density estimates do not group data points together into discrete bins. Rather, with kernel density estimates a normal distribution (e.g., bell curve) is placed over each data point with the peak of the distribution centered at the value of the data point. The variance of the normal distribution may be set to any value (e.g., 2.25) and modified to improve estimation of character frame size. The values of the respective normal distributions are summed to generate a continuous kernel density estimate. Peaks in the kernel density estimate may indicate the most probably grid size similar peaks in the histogram 210.

Knowing that the text of the scan 200 was probably originally laid out in a grid format with a line gap between the lines allows for construction of the grid framework 216. Inferring that the tall column 212 represents the height 218 of a character frame 220 and knowing that character frames are square, it can be determined that a width 222 of this character frame 220 is also nine points. Subtraction of the length represented by peak 212 from the length represented by the other tall peak 214 provides the line gap 224 spacing. As the number of characters in the scan 200 increases, the accuracy of the approximations for character frame 220 and line gap 224 sizes will increase.

The character frame 220 represents the space occupied by a full-width character, the most frequent type of character in Japanese text. Once that size is known it is possible to derive the size of a half-width character simply by dividing the height (for vertical text) of the character frame 220 in half. Other sizes of characters such as ruby, small kana characters, third-width characters, and the like may also be determined in reference to the size of the character frame 220.

Using the histogram 210, whether generated graphically or simply represented as numbers in computer memory, keeps an aggregating function from being skewed by outliers such as short/long vertical distances 206 and horizontal distances 208. Other techniques for identifying a representative value from multiple samples such as average, median, and mode may also be used, but are more susceptible to influence from outliers.

Text Block Frame

A block of text is laid out on a printed page is organized according to a text block frame that specifies the default dimensions of the main area of text on a typeset page. The text block frame is defined by identifying a top edge, a bottom edge, a left edge, and a right edge. For vertical text, the top edge of the text block frame corresponds with the start of a line of text. For horizontal text, the left edge of the text block frame corresponds with the start of a line. The characters in text on the page of the printed material 102 are generally arranged in a grid within the text block frame. However, there are exceptions such as indentations at the first line of paragraphs, short lines of text that do not extend to the bottom of the text block frame, hanging punctuation, accent marks, that make accurate identification of the boundaries of a text block frame through geometric analysis challenging.

Figure 3:
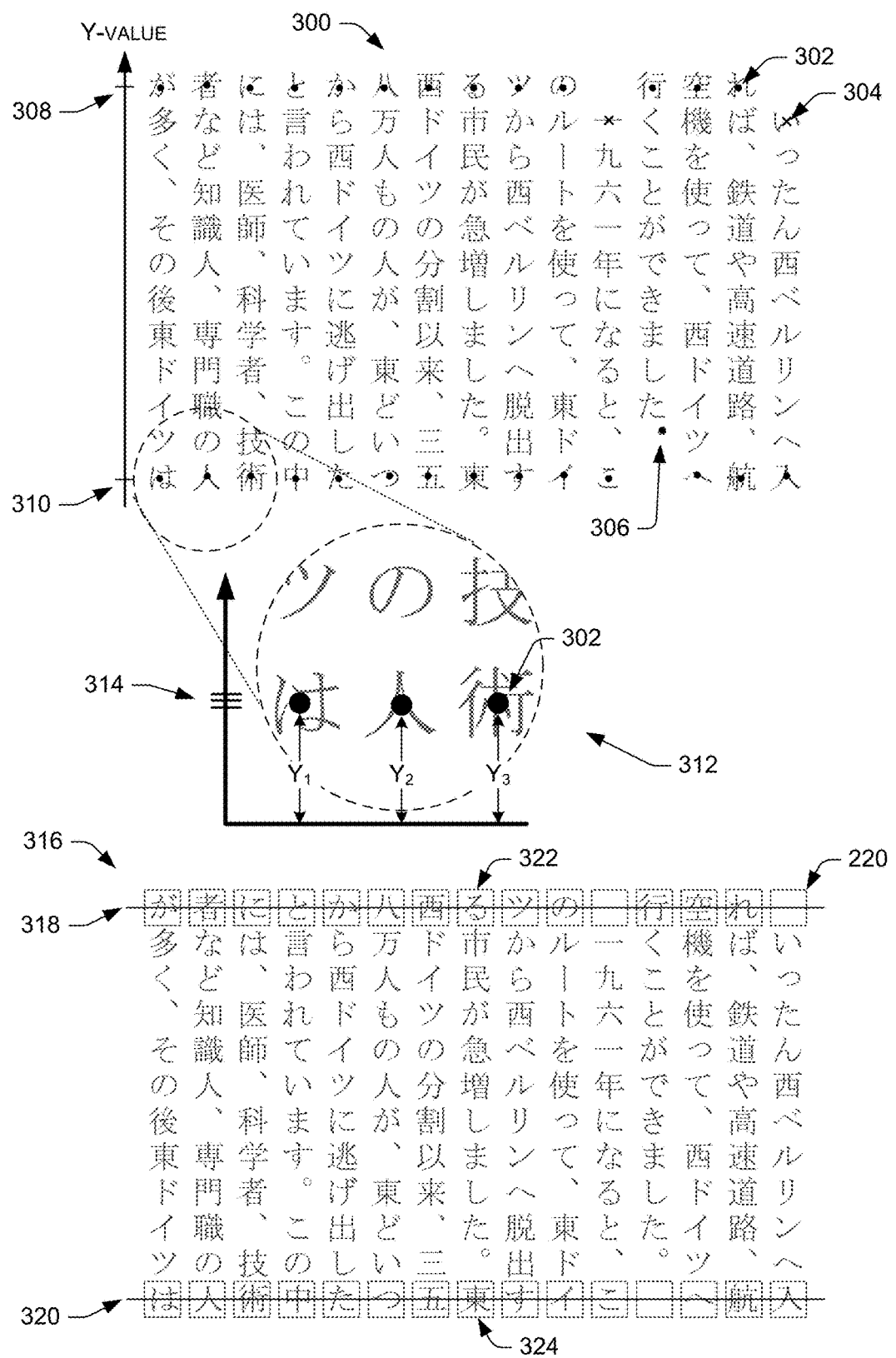
FIG. 3 illustrates an example technique for determining a start-grid center and an end-grid center of a block of text.

FIG. 3 shows the identification of a top edge and bottom edge (for vertical text) of a text block frame based on the character frame 220 and the location of character centers. View 300 of a block of text includes character centers 302 identified for the characters that start a line and the characters that end a line. The first line of each paragraph may be indented and identified as such by the indentation. The centers 304 of the first character of each paragraph, shown here as x marks, may also be identified, but distinguished from the centers of the other characters at the start of a line of text. Exceptions also exist for the characters at the ends of lines of text such the period with its center 306 above the centers of the other end-of-line characters. However, end-of-line exceptions may be more difficult to automatically exclude because there are many reasons a line could end before the bottom of a paragraph block.

The locations of the centers 302 of the characters at the start of the lines may be indicated as a value relative to a coordinate system. In this example of vertical text, the displacement from a reference point or line is illustrated as a "y-value." The coordinate system may be arbitrary. In some implementations it may be based on a coordinate system of the scanner 104. Location 308 illustrates a representative y-value of the centers 302 of the characters at the start of the lines excluding the indented characters at the start of paragraphs. Similarly, location 310 shows a representative y-value or displacement from the reference point that is representative of the locations of the centers of the characters at the ends of the lines.

The enlargement 312 shows a technique for determining the representative y-value 310. The centers 302 of the characters in the last lines of the text each have a displacement from a reference location shown here as $Y_1$, $Y_2$, and $Y_3$. The reference location may be a line, a point, or another other reference area. Each of the three y-values is shown as an amount of displacement on the y-axis 314. The y-axis locations 314 of the centers 302 of the characters at the end of the lines may be grouped into a histogram similar to histogram 210 shown in FIG. 2 to identify the most frequent value for displacement along the y-axis. The most frequent value, illustrated as the longest bar in a histogram, is taken as the representative value for the displacement on the y-axis 314 of the centers 302 of the characters at the end of the lines of text.

The next view 316 of the text block illustrates the start-grid center line 318 and the end-grid center line 320 determined from the representative y-values 308 and 310 of the first characters of the lines of text and of the last characters of the lines of text respectively. Although the start-grid center line 318 and the end-grid center line 320 may not pass exactly through the centers 302 of each character in at the start and end of the lines, the start-grid center line 318 and the end-grid center line 320 provide reference lines from which a text block frame can be created around the text block 316. Placement of the start-grid center line 318 and the end-grid center line 320 by the above techniques may not always produce optimal results. Accordingly, there may be mechanisms for the editor 110 to view and adjust placement of the lines 318 and 320.

Centers of character frames 220 may be aligned with the start-grid center line 318, the end-grid center line 320. Horizontal alignment of the character frames 220 may be based on the locations of the centers 302 of the characters surrounded by the character frames 220. Placement of the character frames 220 at the start (i.e., the top for vertical text) of the text block 316 and at the end (i.e., bottom for vertical text) of the text block 316 enables location of two sides of the text block frame. The start of the text block frame is set at the outside edge 322 of the character frames 220 in line with the start-grid center line 318. In this example of vertical text, the outside edge of the character block 220 or the edge of the character block 220 most distant from the text is the top edge. Because each of the character blocks 220 is the same size and centered on start-grid center line, the start of the text block frame is a line that is parallel to the start-grid center line 318 and is displaced half a character block 220 size from the start-grid center line 318.

A bottom edge 324 of the text block frame is located in a similar matter by identifying the outside (i.e., bottom for vertical text) edge of the text block frames 220 aligned along the end-grid center line 320.

Figure 4:
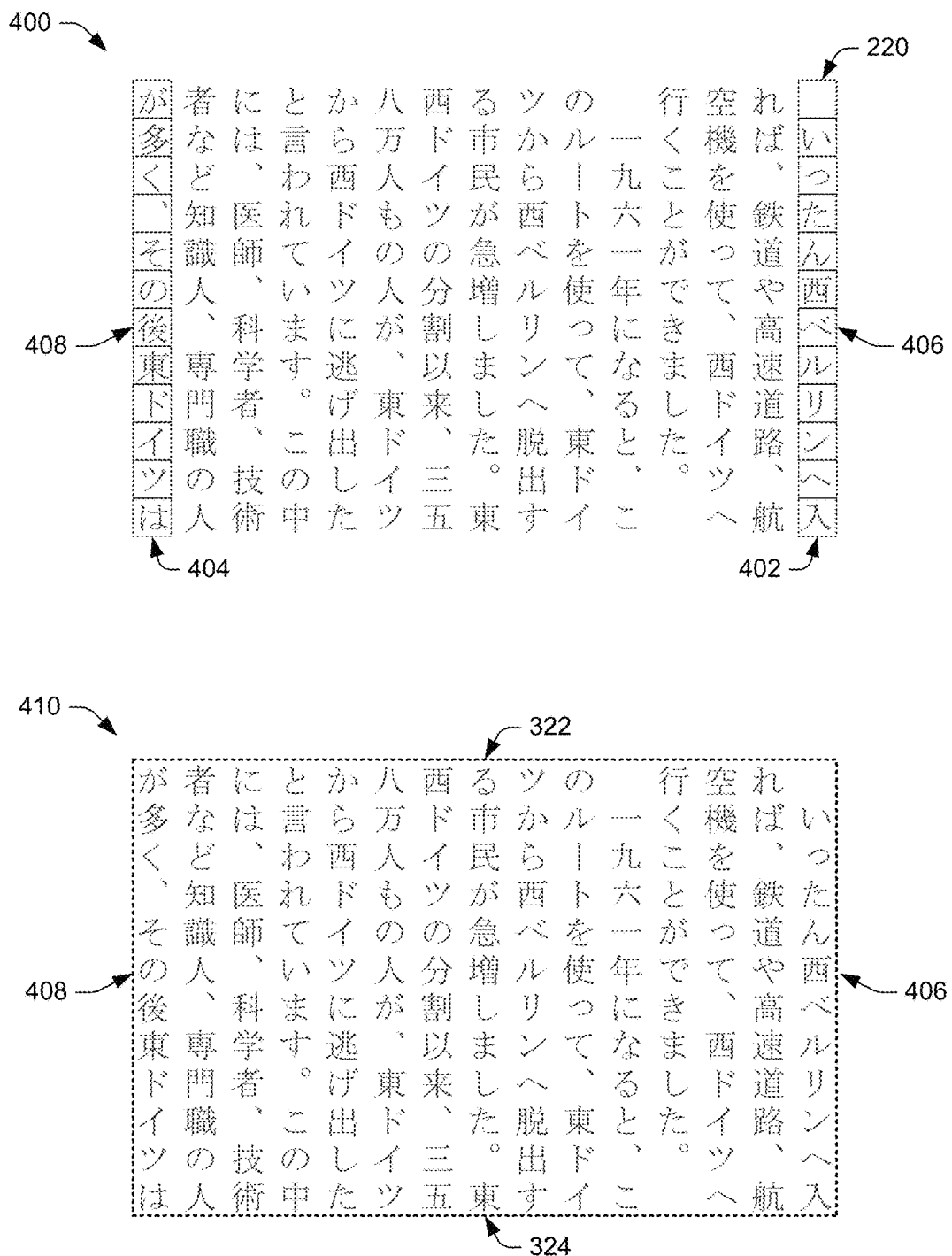
FIG. 4 illustrates an example technique to locate edges of a text block frame.

FIG. 4 shows the identification of the remaining two sides of the text block frame. The view 400 of the text block shows character frames 220 aligned along the first 402 and last 404 lines of the text block 400. The outside edges of these character frames 220 are used as a right edge 410 and a left edge 408, for vertical text, of the text block frame.

Determination of the four edges 322, 324, 406, and 408 surrounding this text block provides a text block frame 410 specific to this text block and derived from geometric analysis of the characters in the block of text.

Character Spacing

Character spacing that cannot be copied directly from the scan of the printed material 102 may be inferred from geometric characteristics of the text layout. If text is reflowed to fit a display device, an end-of-line character may be placed adjacent to a start-of-line character from the next line. Simply abutting the two character frames to each other may provide inter-character spacing that is approximately correct (i.e. spacing as it would be if the publisher had laid out these two characters together on the same line) in only some cases such as when both characters are full-width characters centered in their respective character frames. However, as with other issues of Japanese and other East Asian text layout, there are numerous exceptions and variations for different character sets (e.g., kanji, katakana, hiragana, English) that make inference of correct inter-character spacing more challenging.

FIG. 5A shows a technique for determining inter-character spacing for two characters that are split across different lines in the original printed material 102 but are placed next to each other when the text is reflowed. In the original layout 500 the analysis begins by identifying the start-grid center 318 and the end-grid center 320. Character frames are aligned with the characters and with the start-grid center 318 or the end-grid center 320.

For hanging punctuation 502, a character frame is positioned around the character 504 preceding the hanging punctuation using the end-grid center 320 to align the character frame. Then an additional character frame is placed after the preceding character to surround the hanging punctuation 502. Space after the hanging punctuation 502 is the distance 506 between the end of the hanging punctuation 502 (i.e., the bottom of the mark representing the hanging punctuation) and the end of the additional character frame. Hanging punctuation 502 may be identified as such by determination that a punctuation character (e.g., a comma or period) is located outside of the text block frame (e.g., text block frame 410 shown in FIG. 4).

For the character at the start of the line following the hanging punctuation 502, a distance 508 between the top of the character and the top of its character frame is determined. For characters that are half-width or otherwise smaller than full-width characters, an appropriately reduced character frame size is used to determine the spacing between a character and its surrounding character frame. For horizontal text, the spacing of interest is not above and below the characters but is to the right and left of the end-of-line characters and the start-of-line characters respectively.

When the text is converted from the original layout 500 to a reflowed layout 510, the combination of the distance 506 below the hanging punctuation and above the distance 508 above the next character provides a spacing gap for positioning the character images.

When the final character of a line is not hanging punctuation (it could, however, be a punctuation character) the surrounding character frame is aligned with the end-grid center line 320 and distance 512 between the end of the character and the end of the character frame 220 is determined. The amount of spacing may vary depending on where a particular character is located relative to its surrounding character frame. In this example, hanging punctuation 502 is located farther from the bottom of a surrounding character frame that a full-width character resulting in the size of distance 506 being larger than the size of distance 512.

In FIG. 5B showing the reflowed layout 510, distance 512 is followed by distance 514 representing the distance between the top of the next character to that character's surrounding character frame. In this example the character at the start of the next line is hiragana character that occupies less of a character frame than then kanji character at the bottom of the previous line, so the distance 512 below the kanji character is smaller than the distance 514 above the hiragana character. These spacing rules enable the joining of two characters from separate lines with an inter-character spacing that is congruous with other inter-character spacing in the original layout 500.

For characters that are adjacent in the original layout 500 and remain adjacent in the reflowed layout 510 the inter-character spacing 516 remains the same. Of course, the reproduction of the printed material 102 on an electronic display may increase or decrease the absolute size of the character. Therefore, the inter-character spacing 516 remains proportionally the same relative to the sizes of the characters.

Non-Line-Starters and Non-Line-Enders

Certain characters are not placed at the start of a line of text and other characters are not placed at the end of a line of text. These classes of characters are referred to herein respectively as "non-line-starters" and "non-line-enders" or in Japanese "gyōtō kinsoku moji" and "gyōmatsu kinsoku moji." Appropriate layout of text for presentation in the printed material 102 should account for these limits on character placement. However, when line length is changed and sentences are reflowed to accommodate an electronic display, systems that fail to adjust for non-line-starters and non-line-enders may produce text layout errors such as placing a period at the start of a line.

FIG. 6 illustrates examples 600 of text layout without adjusting for non-line-starters and non-line-enders and further examples 602 of the same text in which reflow of the text is adjusted for non-line-starters and non-line-enders. During optical character recognition, characters in a scan or other electronic file may be classified as non line-starters, non-line-enders, or other characters that are permitted to be placed at the start or end of a line of text. Classification of characters as non-line-starters or non-line-enders allows for reflowed text to be revised or adjusted thereby avoiding prohibited character placements. This may be implemented as an iterative process, for example, first reflowing text to fit the size of an electronic display and then adjusting the text based on non-line-starter and non-line-ender rules which may require further reflowing of the text and possible additional adjustment for non line-starter and non line-ender rules. This process can continue until a stable layout is achieved.

The first example shows the movement of a period 604, which is a non-line-starter, from the start of a line to the bottom of the previous line. Because the period 604 is a type of punctuation that may be hanged below a text block frame and the previous line of text extends to the bottom of the text block frame, the period 604 is positioned as hanging punctuation.

The next example shows a prolonged sound mark 606, which is a non-line-starter character, moved to the second position in the line of text by placing the character 608 from the end of the previous line 610 before the prolonged sound mark 606. After removal of the character 608 from the previous line 610, there is a gap in that previous line 610. To remove the appearance of the gap, the previous line 610 may be reformatted with modified character spacing. The first and last characters of the line 610 are aligned with the first and last character frames of the underlying grid (e.g., see the view 316 of the text block showing the start-grid center line 318 and the end-grid center line 320). Spacing between characters in the middle of the line 610 may be expanded to evenly fill the extra space.

In the third example, an opening corner bracket 612, which is a non-line-ender is moved from the bottom of a line to the top of the next line 614. Positions of characters in that line 614 may have modified spacing to accommodate the addition of the opening corner bracket 612. In this example, spaces between the characters may be compressed while keeping the first and last characters in the line aligned with the underlying grid. In some implementations, characters spacing in the line 616 from which the opening corner bracket 612 was removed may also be adjusted.

Illustrative User Interfaces

Figure 7:
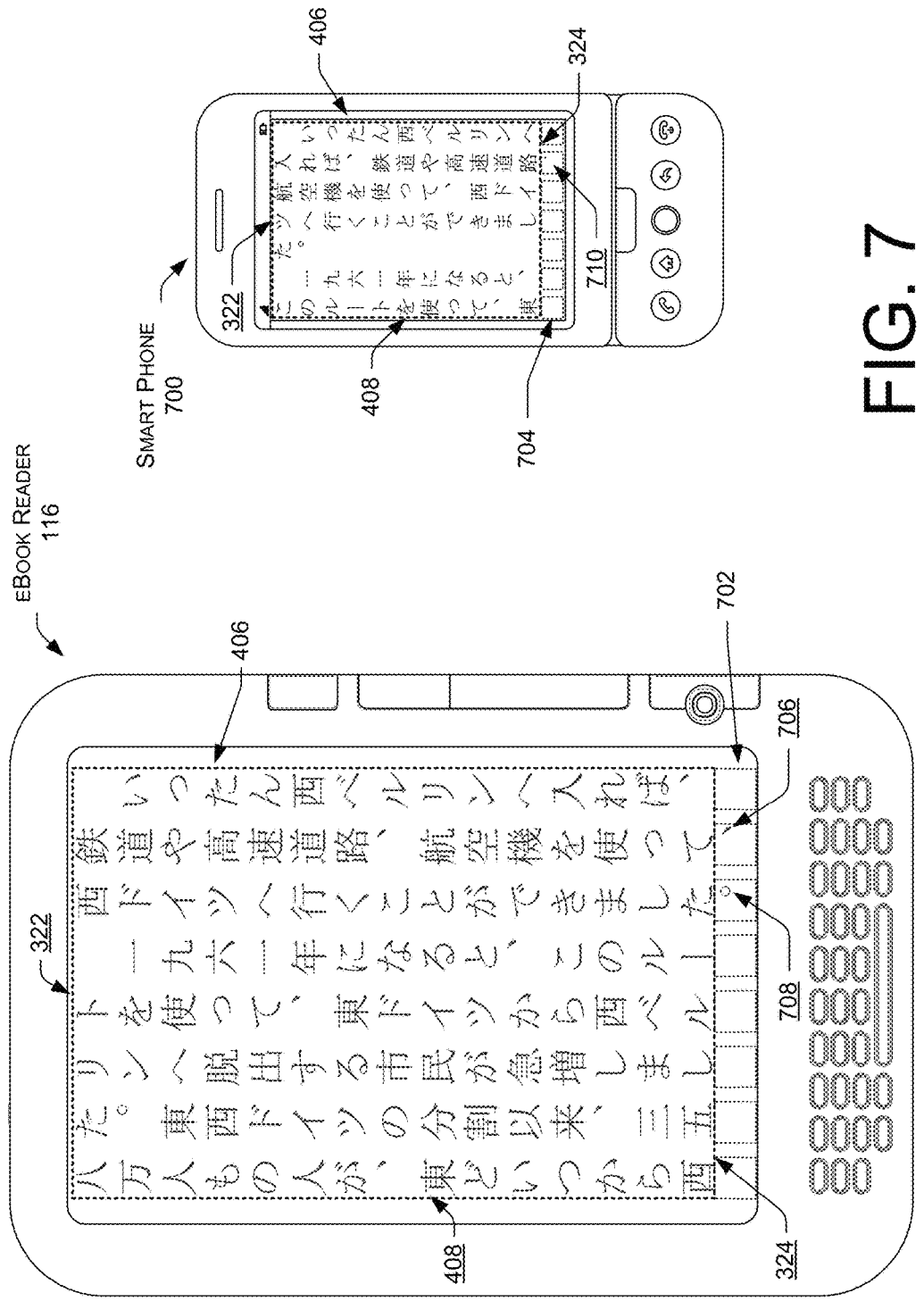
FIG. 7 shows two different electronic devices displaying the same text on different sized screens.

FIG. 7 shows Japanese text formatted to fit the screen size and zoom level selected for display on an eBook reader 116 and a smart phone 700. Different devices may have different screen sizes measured both in terms of length such as millimeters or inches and in display resolution such as pixels. In this example, the eBook reader 116 has a larger display screen than the smart phone 700. However, the formatting and reflowing techniques discussed above adapt text to appear in a similar style as it was originally published on both the screens of the eBook reader 116 and of the smart phone 700.

The display screens of both devices 116 and 700 are formatted according to the text block frame identified in FIGS. 3 and 4 creating a rectangular portion of the display screens that is bounded by four lines 322, 324, 406, and 408. Character frames are positioned inside of the text block frame to provide an underlying grid for arranging characters.

An additional line of character frames 702 and 704 is placed below the end 324 of the text block frame to provide space to insert hanging punctuation 706, 708, and 710. The additional line of character frames 702 and 704 may provide space for full-width character frames as shown in FIG. 7 or, in some implementations, may include only half-width character frames to accommodate hanging punctuation with a less screen space. In order to provide a consistent visual appearance, the additional line of character frames 702 and 704 may be included in all displayed pages of text even if there are no hanging punctuation characters in a particular page of text.

Illustrative Computing Devices

Figure 8:
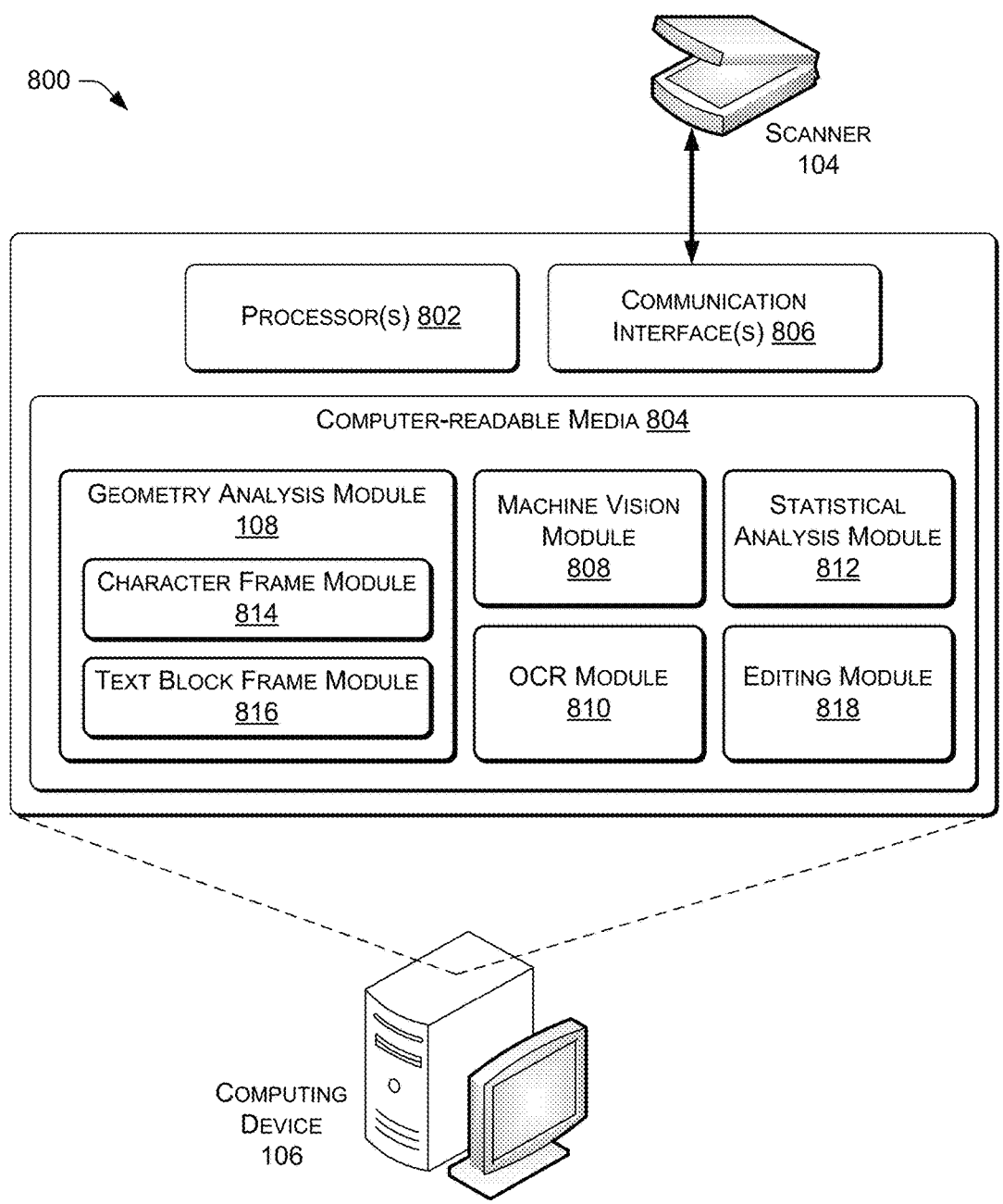
FIG. 8 is a block diagram showing components of the computing device 106 of FIG. 1 in greater detail.

FIG. 8 is a schematic representation 800 of components and modules that may be present in the computing device 106 of FIG. 1. The computing device 106 may include one or more processors 802 and one or more forms of computer-readable media 804. In some implementations, the computer-readable media 804 may be implemented in hardware or firmware. The computer-readable media 804 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer-readable medium which can be used to store information and which can be accessed by a processor. The computer-readable media 804 may also contain an operating system for controlling software modules stored in the computer-readable media 804 and for controlling hardware associated with the computing device 106.

The computing device 106 may include a communications interface 806 that is capable of communicating with a network such as the Internet or other electronic communications network as well as peripheral devices such as the scanner 104 from FIG. 1. Scans of text generated by the scanner 104 may be initially received by the communications interface 806 and passed to other modules and components of the computing device 106 for further analysis and processing.

A machine vision module 808 stored in the computer-readable media 804 may receive a scan of text, identify individual characters in the scan, and determine locations of centers of the individual characters. The scan may be received from the communications interface(s) 806. The machine vision module 808 may identify objects in the scan such as characters, punctuation, and other markings. Those of ordinary skill in the art will recognize a wide variety of algorithms and techniques capable of implementing machine vision. With machine vision, limited information such as the location and size of characters in a digital image may be ascertained, but the actual identities of the characters, or even the language of the characters, need not necessarily be determined.

The computer-readable media 804 may also include an optical character recognition (OCR) module 810 comprised of program code and data designed to analyze digital images containing text and identify individual characters. Those of ordinary skill in the art will recognize a wide variety of algorithms and techniques capable of analyzing and recognizing objects in an image. For purposes of the present disclosure, however, it is not necessary that the algorithms and techniques actually recognize every individual character or symbol or interpret their meanings, as achieved by many OCR routines. For example, the OCR module 810 may only identify characters as members of a particular class without further resolving the identity of the character. For example, characters may be identified as non-line-enders, non-line-starters, or regular characters. This level of identity may be sufficient to identify both periods and commas as non-line-starters without determining whether a specific character is a period or a comma.

The computer-readable media 804 may also include a statistical analysis module 812 for determining a representative value from a group of values. In one implementation, the statistical analysis module 812 may include a histogram generation algorithm for grouping multiple individual values into a series of bins and identifying the number of individual values that are placed into each of the bins. In some implementations, the bins may be static sized bins and the value of each bin, or column of the histogram, may be the median of the value of the individual values placed into that bin. When visualized, this analysis may produce a histogram. However, the statistical analysis module 812 may generate a histogram or analyze data according to a histogram without displaying a histogram for viewing by a human user.

The statistical analysis module 812 may identify a representative value of center-to-center distances between characters in the scan, a representative value of displacements of centers of characters at the start of lines of text, a representative value of the displacements of centers of characters at the ends of lines of text, and other representative values. In each of these examples, numerous values may be observed on the scan by the machine vision module 808, and due to variations in the shape and layout of individual characters, the machine vision module 808 may observe a range of values including many that are close to the "true" or "accurate" value and a few values that are outliers. A histogram generated by the statistical analysis module 812 may have one column that is taller than any of the other columns in the histogram representing the grouping of values that are close to the "true" value while less frequent or outlier values are grouped into columns other than the tallest column. Therefore, the value of this tallest column may be interpreted as a value that is a representative value. This technique may exclude the influence of outlier values better than an average, median, or mode.

The geometry analysis module 108 shown in FIG. 1 may be stored in the computer-readable media 804 and be comprised of program code and data designed to determine center-to-center distances between the centers of the individual characters and displacement distances between the centers of individual characters and a reference location. The geometry analysis module 108 may identify positions of individual characters in the scan relative to an underlying grid derived at least in part from the character frames 220 and from the text block frame 410. Thus, the reference location may be a line on the underlying grid. In other words, the geometry analysis module 108 may analyze geometries recognized by the machine vision module 808.

The geometry analysis module 108 may include a character frame module 814 and a text block frame module 816. The character frame module 814 may comprise program code and data designed to determine dimensions of the character frame 220 for the characters in the scan based on the representative value of center-to-center distances. The representative value of center-to-center distances may be determined by the statistical analysis module 812.

The text block frame module 816 may comprise program code and data designed to determine the edges of the text block frame 410 as shown in FIGS. 3 and 4. The text block frame module 816 determines a start edge 322 of a text block frame around the scan based on the representative value for displacement distances of centers of individual characters at the start of lines of text and the dimensions of the character frame 220. The text block frame module 816 also determines an end edge 324 of the text block frame based on the representative value for displacement distances of centers of individual characters at the end of lines of text and the dimensions of the character frame 220. Additionally, the text block frame module 816 may determine side edges 406 and 408 of the text block frame based on alignment of character frames 220 surrounding characters at the sides of the block of text.

The computer-readable media 804 may additionally store program code and data providing an editing module 818. The editing module 818 may contain program code and data for enabling a human editor 110 to modify decisions or assumptions generated by other modules such as the geometry analysis module 108.

Figure 9:
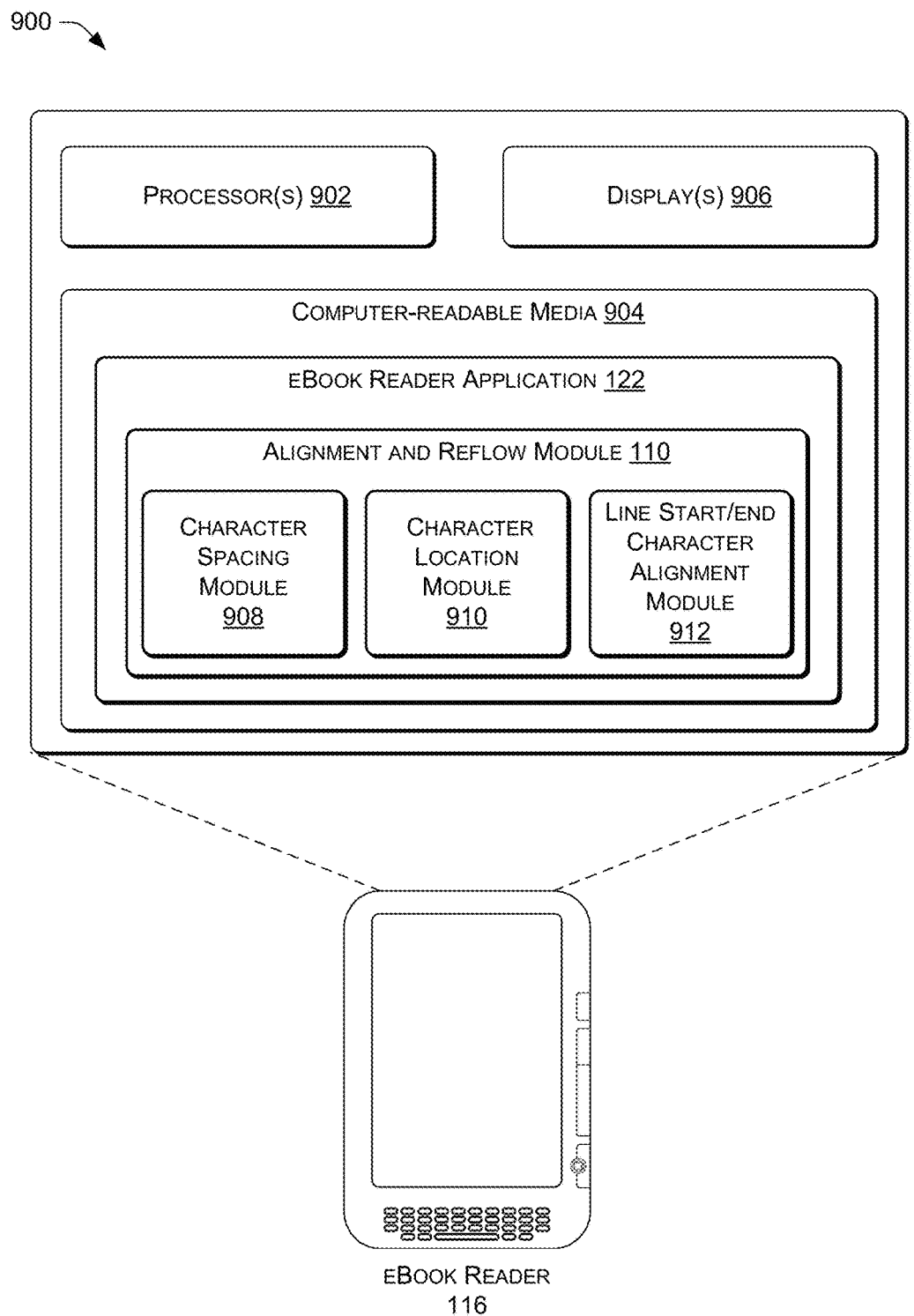
FIG. 9 is a block diagram showing components of the eBook reader 116 of FIG. 1 in greater detail.

FIG. 9 is a schematic representation 900 of components and modules that may be present in the eBook reader 116 of FIG. 1. The eBook Reader 116 may include one or more processors 902 and one or more forms of computer-readable media 904. The computer-readable media 904 may also contain an operating system for controlling software modules stored in the computer-readable media 904 and for controlling hardware associated with the eBook reader 116. The eBook reader 116 may also include one or more displays 906 for rending eBook content such as content contained in the eBook file 112.

The eBook reader application 122 shown in FIG. 1 may be stored in the computer-readable media 904. As shown in FIG. 1, the eBook reader application 122 may include the alignment and reflow module 110. The alignment and reflow module 110 may be comprised of program code and data designed to generate a layout of the text for display on an electronic display that maintains the character spacing from the scan, avoids placing non line-starter characters at a line start, and avoids placing non line-ender characters at a line end. In order to do so, the alignment and reflow module 110 may contain a character spacing module 908, a character location module 910, and a line start and line end character alignment module 912.

The character spacing module 908 may be configured to capture character spacing from a scan of text. The character spacing may include horizontal offsets and vertical offsets of characters in the scan from the center of a character frame 220 surround the respective character. The horizontal offset is important because not all characters are positioned to the center of their respective character frames 220. For example, punctuations normally have offsets, in the case of vertical text, to the far right of a character block 220. However, individual publishers may layout text with different offsets so capturing offsets directly from the scan will accurately preserve unique layout and offset choices of the original printed material 102. Vertical offsets, for vertical text, determine the closeness of character spacing. Different Japanese characters have different spacing that may vary depending on the preceding or following character and the characters location such as at the start of a line or at the end of a line. The vertical offset rules may also vary across publishers so capturing character spacing from the scan of text is one way to preserve the original look and feel.

The character location module 910 may identify non-line-starter characters and non-line-ender characters from the scan. This identification may be performed in conjunction with classification of characters provided by the OCR module 810 in the computing device 106. In addition to identifying the characters, the character location module 910 may move the non-line-starter character from the line start or move the non-line-ender character from the line end and regenerate the layout when an initial layout places the non-line-starter character at the line start or places the non-line-ender character at the line end.

The line start and line end character alignment module 912 may align the centers of characters that occupy an initial position in a line with each other and align the centers of the characters that occupy a final position in a line with each other. Certain punctuation characters such as periods and commas may be hung beyond the end of the line and in such cases these characters are not aligned with other characters occupying the final position in a line. By aligning the first characters of each line and the last characters of each line (with the exception of some punctuation characters) the appearance of the text as displayed on an electronic display reasonably approximates the more formal layout rules of Japanese text without the necessity of implementing all of those rules. In some implementations, characters positions in the middle of a line may be equally distributed across the space available between the first and last characters of that line. The equal distribution of the characters reduces the occurrence of very large inter-character spaces are very small inter-character spaces.

Illustrative Processes

These processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 10:
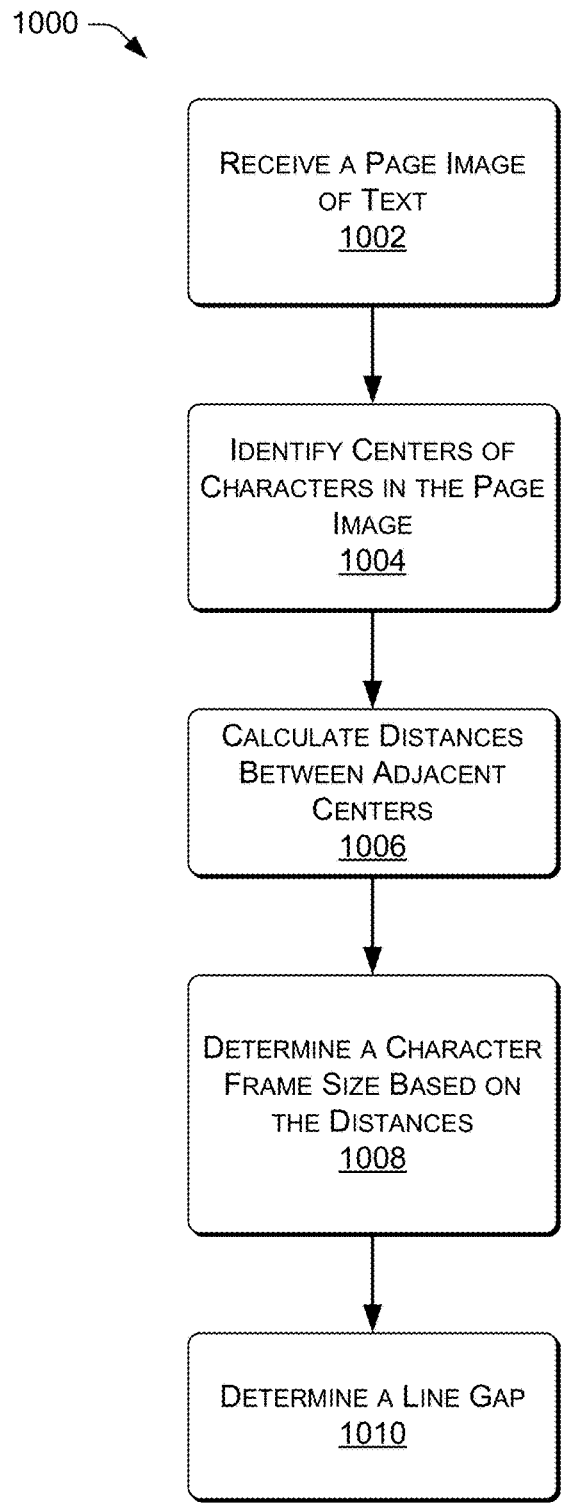
FIG. 10 is an illustrative flow diagram of a technique for determining a character frame size.

FIG. 10 illustrates a process 1000 for determining a frame size of characters received in a scan of text. The process 1000 may be implemented in whole or part by the character frame module 814.

At 1002, a scan of text is received. In some implementations, the scan may be a scan of a printed page of text (e.g., from the printed material 102) formatted according to an underlying grid such as the kihon hanmen framework for Japanese text or a grid for another East Asian script.

At 1004, centers of a plurality of characters in the scan of text are identified. The plurality of centers may be determined for the plurality of characters by a geometric center of the respective characters. The geometric center of the characters may be determined by the machine vision module 808. In some implementations, the centers of all or essentially all of the characters from the scan of text received at 1002 may be determined. For example, centers of at least a threshold percentage (e.g., 50%, 80%, 95%, etc.) of the characters in the scan may be identified. Identifying the location of centers from a larger rather than smaller number of characters may improve accuracy by minimizing the effects of individual outliers.

At 1006, a plurality of distances between adjacent ones of the centers are calculated. Calculating the distance between adjacent ones of the centers may include calculating at least one horizontal distance between two centers of horizontally adjacent characters and at least one vertical distance between two centers of vertically adjacent characters.

At 1008, a character frame size for the text is determined based at least in part on the plurality of distances between the centers. In some implementations statistical analysis (e.g., provided by the statistical analysis module 812) may be used to determine a single distance to use as the character frame size. One type of analysis may involve a clustering function such as a function that groups the distances between character centers into a histogram of distances, or kernel density estimation, to identify the most frequent range of distances. Generation of the histogram may include placing individual ones of the plurality of distances between the plurality of the centers into bins. The bins may be static sized bins and the distance represented by a bin may be a median of the individual ones of the plurality of distances placed into the bin. A distance represented by the bin containing the largest number of individual ones of the plurality of distances (i.e., the peak of the histogram) may be selected as the character frame size.

At 1010, a line gap is determined by calculating a difference between the larger of the clustered horizontal distance and the clustered vertical distance and the smaller of the clustered horizontal distance and the clustered vertical distance. Applying the clustering function (which may include creating a histogram) may generate a clustered horizontal distance from a plurality of horizontal distances and generate a clustered vertical distance from a plurality of vertical distances. If the text is laid out vertically then the horizontal distances will generally be larger because they include the line gap between vertical lines as well as the character frame width. For horizontal text the vertical distance will be larger because the line gaps run horizontally. The character frame size may be the smaller of the clustered horizontal distance and the clustered vertical distance and the larger of the two distances includes the line gap. Thus, this technique is equally applicable to horizontal or vertical text and can also be used to determine if text is arranged in a horizontal or vertical orientation.

Figure 11:
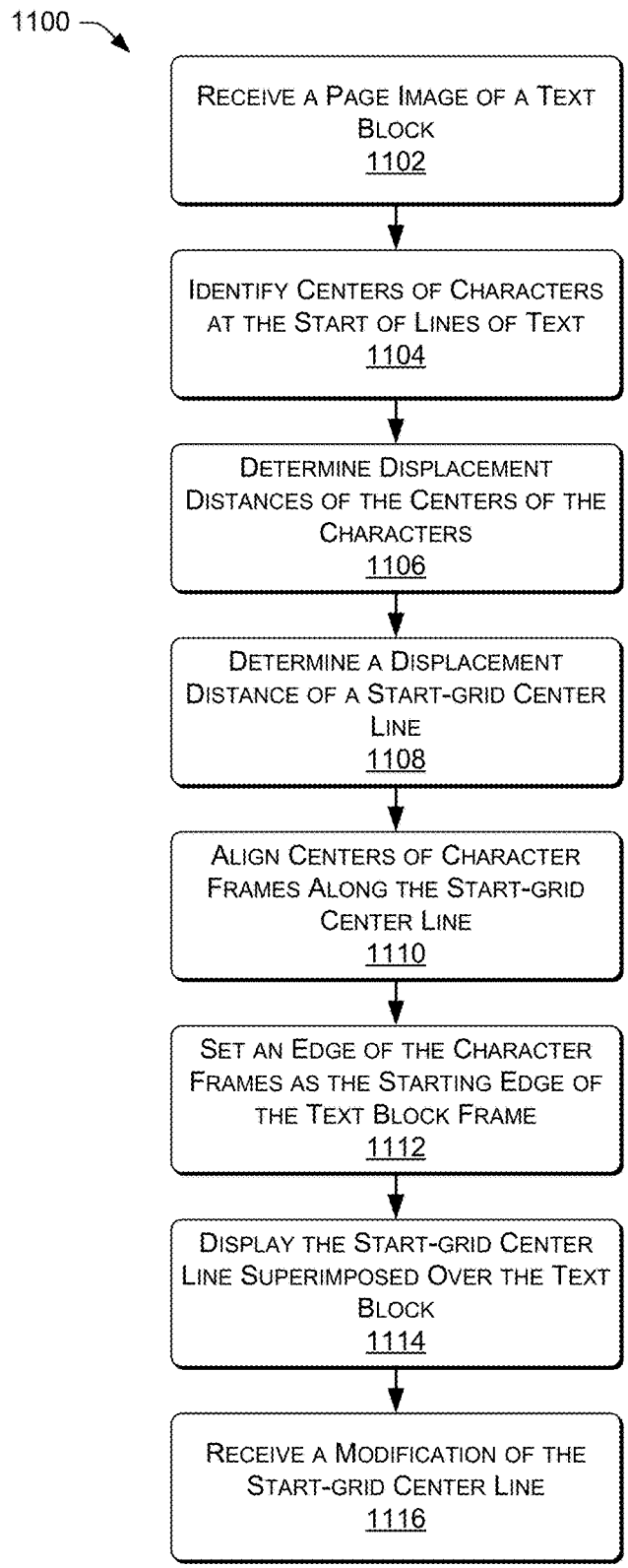
FIG. 11 is an illustrative flow diagram of a technique for determining a start-grid center of a block of text.

FIG. 11 illustrates a process 1100 for determining and modifying a start-grid center line of a block of text. The process 1100 may be implemented in whole or part by the geometry analysis module 108 and/or the text block frame module 816.

At 1102, a scan of a text block is received. The scan may be received from the scanner 104 via the communications interface 806. Alternatively the scan may be received as an electronic file generated earlier such as, but not limited to, a page-image file generated directly from word processing or page layout software.

At 1104, centers of characters at the start of lines of text in the scan are identified. The centers of the characters may be determined by geometric centers of the respective characters. This determination may be made by the machine vision module 808.

At 1106, displacement distances of the centers of the characters from a reference line are determined. The reference line may be derived from a coordinate system or hardware configuration of the scanner 104.

At 1108, a displacement distance of a start-grid center line from the reference line is determined based at least in part of the displacement distances for the centers of the characters. The start-grid center line is parallel to the reference line. The reference line may be based at least in part on a coordinate system of a scanner 104 that generated the scan of the text block. For example, a line along a bottom edge of a scanner bed having a y-value of zero in the scanner coordinate system may be used as the reference line. In order to avoid a shift in the start-grid center line from characters that are not aligned with the top, for vertical text, edge of the text block, determination of the displacement distance of the start-grid center line may exclude the displacement distances of the centers of characters that are in a first line of a paragraph because the first line is frequently indented.

The displacement of the start-grid center line may be derived from statistical analysis of the multiple displacement distances of the centers of the respective characters. In some implementations, determining the displacement distance of the start-grid center line may include placing individual ones of the displacement distances of the centers of the characters into bins (e.g., groupings within a histogram) and selecting a distance represented by the bin containing the largest number of individual ones of the plurality of distances as the displacement distance of the start-grid center line. This statistical analysis may be performed by the statistical analysis module 812.

At 1110, centers of character frames are aligned along the start-grid center line and in line with the lines of text.

At 1112, an edge of the character frames that is parallel to the start-grid center line and most distant from the text block is set as the starting edge of the text block frame.

At 1114, the start-grid center line may be displayed to a user superimposed over an image of the text block. This display may be presented in an editing interface by the editing module 818 to allow the editor 110 to check the automatic placement of the start-grid centerline.

At 1116, a modification of the displacement of the start-grid center line may be received from the editor 110. For example, the editing interface may allow the editor 110 to select the start-grid centerline that was automatically determined and move the line to a different location that the editor identifies as the correct location based on visual inspection of the text block.

Figure 12:
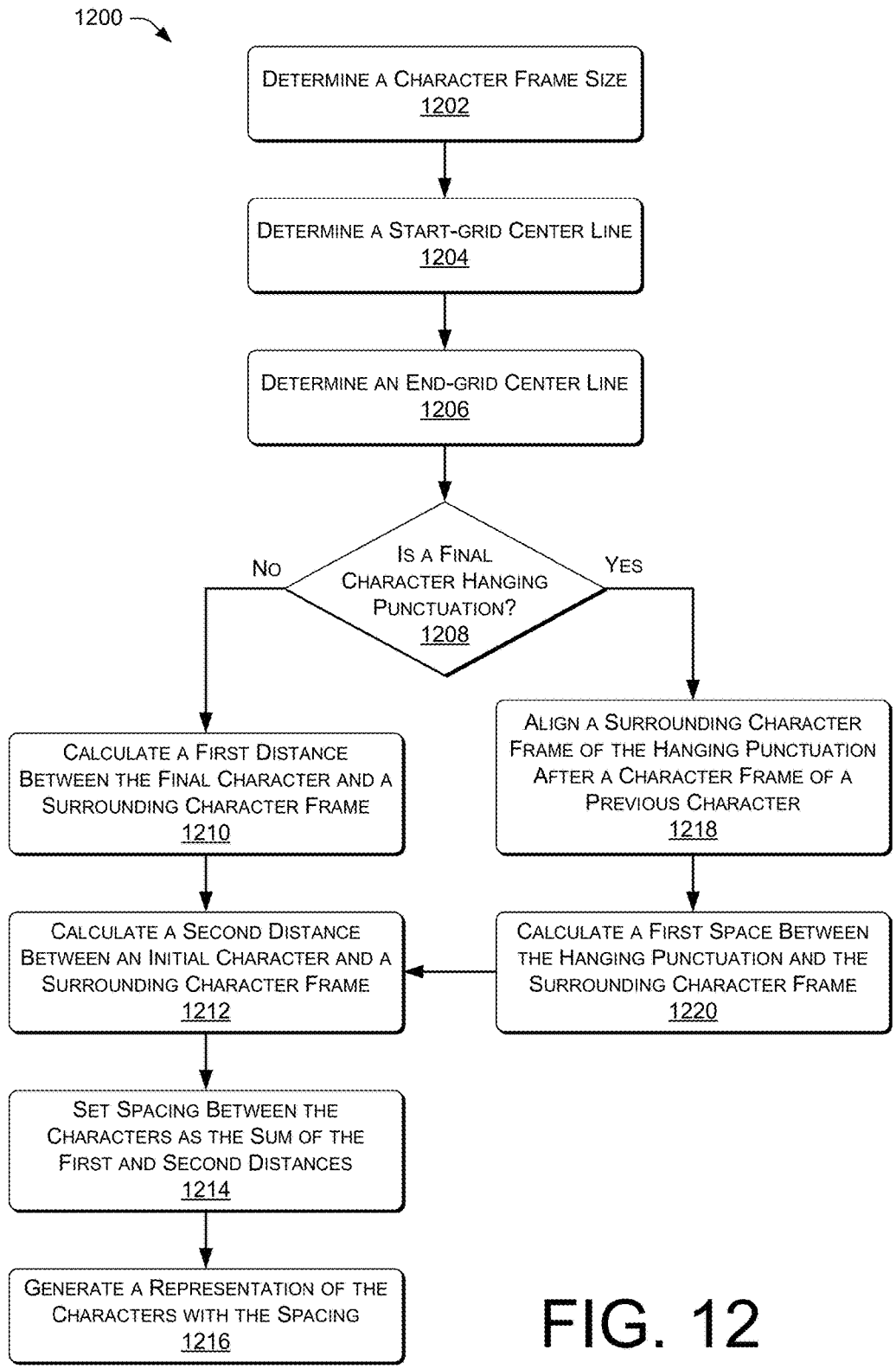
FIG. 12 is an illustrative flow diagram of a technique for determining spacing between two characters that are split across separate lines.

FIG. 12 illustrates a process 1200 for determining spacing between a final character at the end of a line and an initial character at the start of the next line. Identification of the spacing may allow the characters to be properly spaced when joined on the same line for presentation on an electronic display. Process 1200 may be implemented in whole or part by the alignment and reflow module 110 and/or the character spacing module 818.

At, 1202, a character frame size is determined. The character frame size may be determined based on distances between centers of full-width characters. In some implementations, the character frame size may be determined by techniques shown in FIG. 2 and/or by the character frame module 814.

At 1204, a start-grid center line is determined. The start-grid center line passes through the initial character of the line and other initial characters that occupy initial positions of other lines. The location of the start-grid center line may be based on locations of centers of the initial character and the other initial characters. In some implementations, the start-grid center line may be determined by techniques illustrated in FIG. 3 for locating the start-grid center line 318. Additionally or alternatively, location of the start-grid center line may be implemented by the text block frame module 816.

At 1206, an end-grid center line is determined. The end-grid center line passes through the final character of the next line and other final characters that occupy final positions of other lines. The location of the end-grid center line may be based on locations of centers of the final character and the other final characters. In some implementations, the end-grid center line may be determined by techniques illustrated in FIG. 3 for locating the end-grid center line 324. Additionally or alternatively, the location of the start-grid center line may be implemented by the text block frame module 816.

At 1208, it is determined if the final character is a hanging punctuation character. If the final character is not hanging punctuation (e.g., not punctuation or not a type of punctuation that is hanged) then process 1200 proceeds along the "no" path to 1210. If the final character is hanging punctuation (e.g., a period or comma), process 1200 proceeds along the "yes" path to 1218.

At 1210, an amount of space between an edge of the final character and an edge of a character frame, with the size determined at 1202, surrounding the final character is calculated. The center of the character frame surrounding the final character may be aligned with the end-grid center line determined at 1206. For example, with vertical text the space may be the space from the bottom of the character to the bottom of the character frame. In some implementations, this may be similar to distance 512 shown in FIG. 5.

At 1212, an amount of space between an edge of the initial character and an edge of a character frame, again with the size determined at 1202, surrounding the initial character is calculated. The center of the character frame surrounding the initial character may be aligned with the start-grid center line determined at 1204. For example, with vertical text the space may be from the top of the character frame to the top of the character. In some implementations, this may be similar to distance 514 shown in FIG. 5.

At 1214, spacing between the final character and the initial character is set as the sum of the amounts of space calculated at 1210 and 1212. By way of example, the spacing between characters may be similar to the combination of distances 512 and 514 shown in FIG. 5.

At 1216, a representation of the final character and the initial character adjacent to each other on the same line with spacing between the final character and the initial character as the sum of the space calculated at 1210 and the space calculated at 1212 is generated. This representation may be displayed on an electronic display of a device such as the eBook reader 116 or the smart phone 700 shown in FIG. 7.

Returning to 1208 to consider the case of hanging punctuation as the final character of a line, process 1200 proceeds along the "yes" path to 1218.

Figure 5:
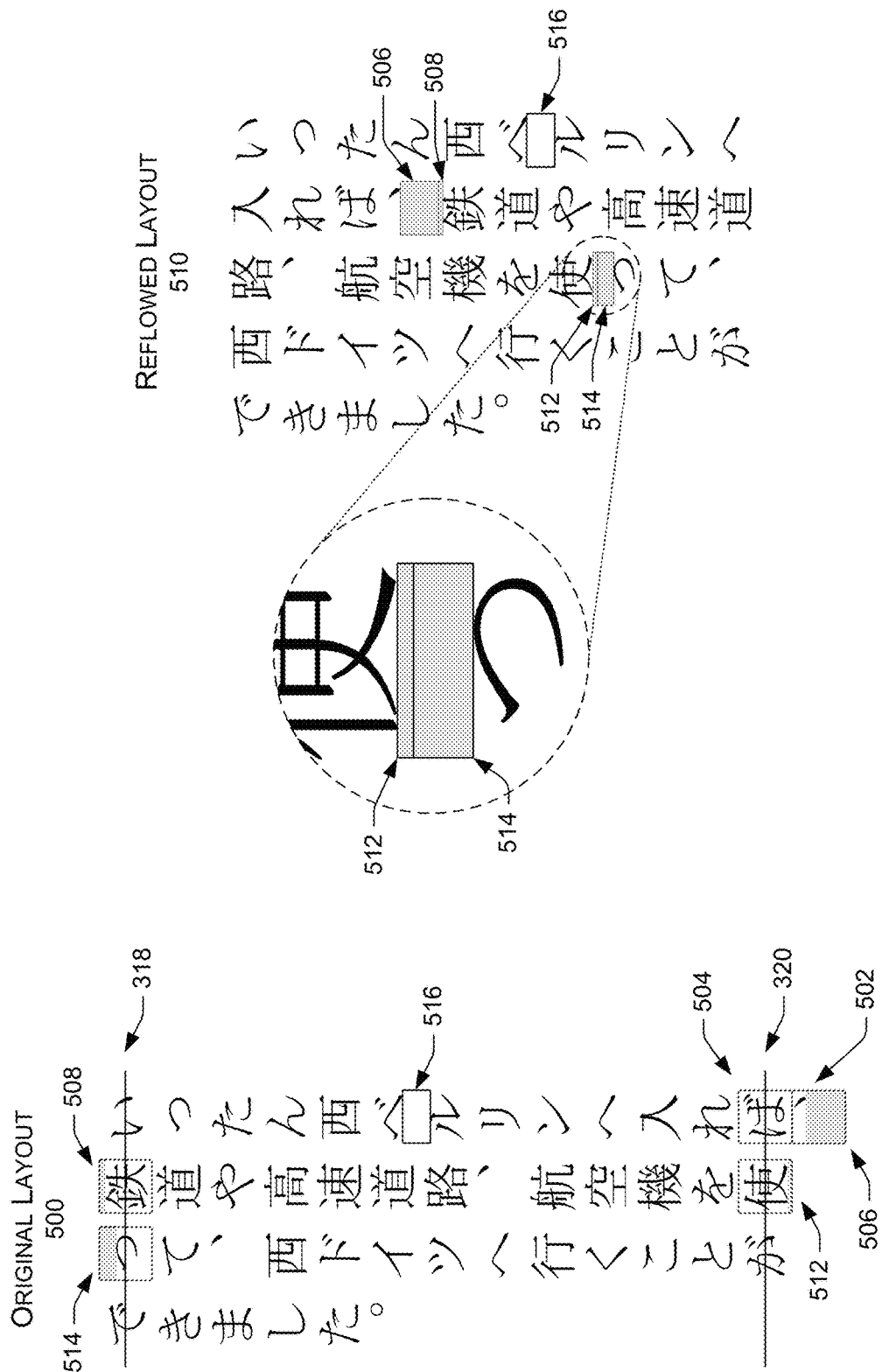
FIGS. 5A and 5B illustrates identification of character spacing between characters that are originally split across separate lines.

At 1218, a character frame surrounding the final character (i.e., the hanging punctuation) is aligned directly after a character frame surrounding the previous character in the same line as the final character. One visual example of this is the hanging punctuation 502 in FIG. 5. Adding an additional character frame around the hanging punctuation provides a "frame" of reference to reflow the hanging punctuation and place it within the middle of a line of text. The center of the character frame surrounding the previous character may be aligned with an end-grid center line that passes through the previous character and other characters that occupy final positions of other lines. If a hanging punctuation is the final character in one of the other lines, the end-grid center line may be aligned so that it does not pass through hanging punctuation. Line 320 in FIG. 5 shows one example of such an end-grid center line.

At 1220, an amount of space is calculated between the hanging punctuation and the character frame surrounding the hanging punctuation. For vertical text, this amount of space may be the space from the bottom of the hanging punctuation to the bottom of the character frame. For example, distance 506 in FIG. 5 provides an illustration of this type of space.

From 1220, process 1200 proceeds to 1212 where the space adjacent to the initial character is calculated as before. Then at 1214, the space between the reflowed characters is set as the sum of the spaces calculated at 1220 and 1212. Finally, process 1200 proceeds to 1216 and generates a representation as before.

Figure 13:
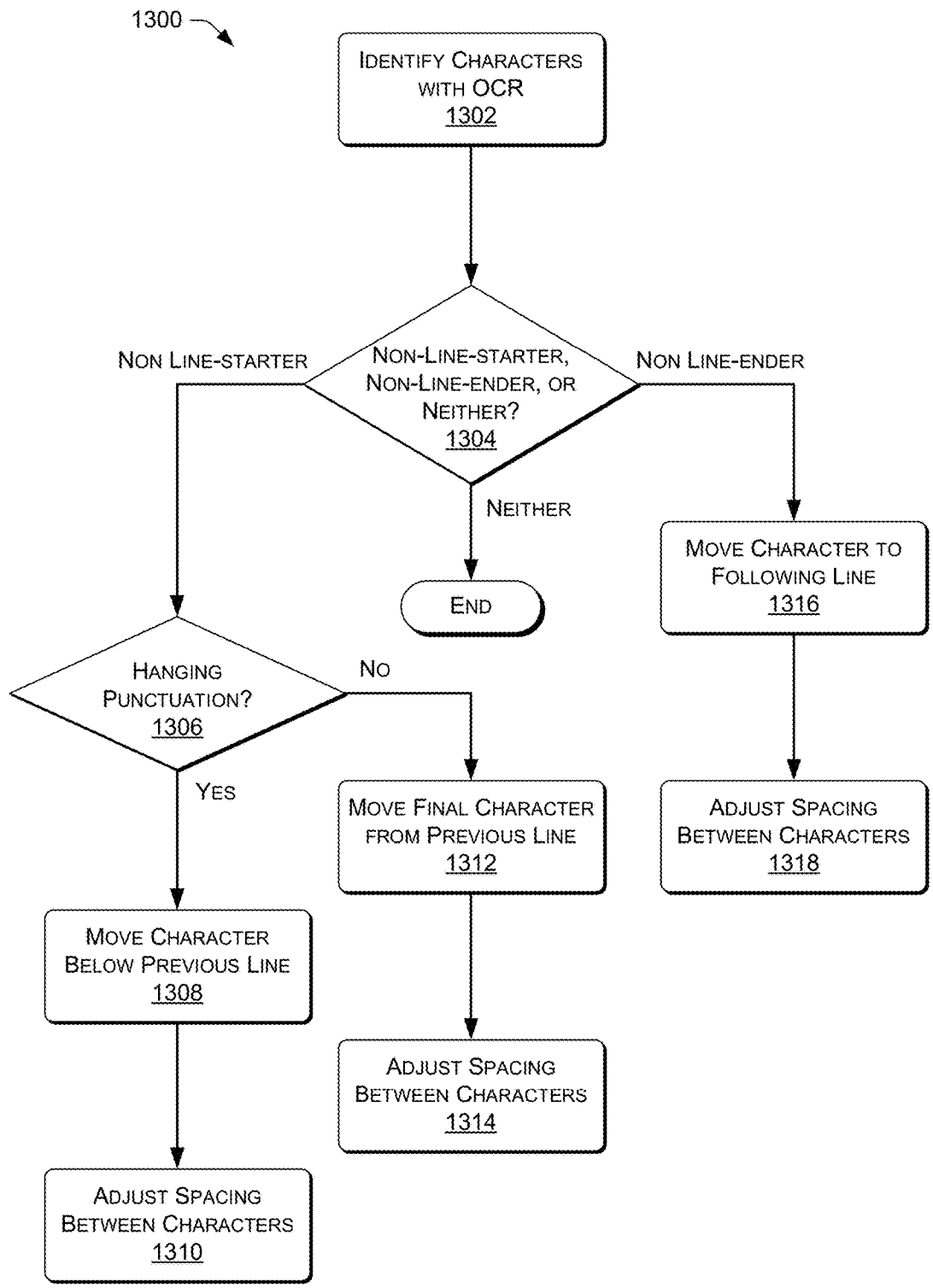
FIG. 13 is an illustrative flow diagram of a technique for moving characters to avoid displaying some characters at the start of a line of text and to avoid displaying other characters at the end of a line of text.

FIG. 13 illustrates a process 1300 for adjusting character layout to avoid placing non-line-starter characters at the start of a line and to avoid placing non-line-ender characters at the end of a line. In some implementations, process 1300 may be implemented in whole or part by the alignment and reflow module 110 and/or the character location module 910.

At 1302, characters are identified with OCR. The identification may be performed by the OCR module 810. The image that is analyzed with OCR may come from the scanner 104 or from a page image generated by another technique.

At 1304, it is determined if individual characters are non-line-starter characters, non-line-ender characters, or other characters that do not have restriction on line position. The determination may end once characters are classified into one of these three groups without more precise recognition. For example, the determination at 1304 may identify a particular character as a closing corner bracket which is a non-line-starter character, but may not differentiate between a single corner closing bracket, double corner closing bracket, bold corner closing bracket, etc. Characters may be identified as belonging to one of these groups by comparison to a list of characters that are non-line-starter characters and non-line-ender characters.

If the character is one of the other characters that do not have restriction on line position, special reflow rules may not be necessary and process 1300 may end. However, if OCR identifies a character as a non-line-starter character, process 1300 proceeds to 1306. If the character is identified as a non-line-ender character, process 1300 proceeds to 1316.

At 1306, it is determined if the non-line-starter character is hanging punctuation that may be hanged beyond the edge of a text block frame. If the character is a hanging punctuation character, process 1300 follows the "yes" path to 1308. However, if the character is not hanging punctuation (e.g., a prolonged sound mark or a closed corner bracket), process 1300 follows the "no" path to 1312.

At 1308, the non-line-starter character (i.e., the hanging punctuation) is moved to a location directly below the end of a previous line of text. Rather than leaving the character at the start of a line, it is hanged below the previous line. One visual example of this is shown in by movement of the period 604 in FIG. 6.

At 1310, spacing between the characters is the line from which the hanging punctuation was removed may be adjusted to account for the space remaining after removal of the hanging punctuation. In some implementations, adjusting spacing between characters in the line of text is achieved by aligning a first character in the line of text with a start-grid center line, aligning a last character in the line of text with an end-grid center line, and distributing other characters in the line of text between the first character and the last character.

Returning to 1306, when the non-line-starter character is not hanging punctuation, process 1300 proceeds along the "no" path from 1306 to 1312. At 1312, a final character of the previous line of text is moved to the start of the line of text that previously started with the non-line-starter character. With this adjustment, a character that is permitted to start a line is placed before the non-line-starter character. One example illustration of this is shown the movement of character 608 above character 606 in FIG. 6.

At 1314, spacing between characters in the previous line of text is adjusted in response to moving the final character to the start of the next line. There may be a gap of one full-width character at the end of the previous line of text and readjustment of the remaining characters may help to maintain a natural appearance for the block of text. In some implementations, the readjustment of characters locations may be similar to the readjustment performed at 1310. For example, adjusting spacing between characters in the previous line of text (i.e., from which the final character was removed) may include aligning a first character in the previous line of text with a start-grid center line, aligning a last character in that line of text with an end-grid center line, and distributing other characters in that line of text between the first character and the last character. An example of this adjustment is shown in expansion of spacing between the characters in line 610 of FIG. 6.

Returning to 1304, process 1300 follows a different path if the character is identified as a non-line-ender character. From 1304, process 1300 proceeds to 1316.

At 1316, the non-line-ender character is moved to a start of the following line of text. Thus, the non-line-ender character becomes a line-starter character for the next line. One illustrative example of this movement is shown by the movement of opening corner bracket 612 in FIG. 6.

At 1318, spacing between characters in the following line of text is adjusted to accommodate inclusion of the non-line-ender character. In some implementations, the readjustment of characters locations may be similar to the readjustment performed at 1310 and/or 1314. An example of this adjustment is shown in compression of spacing between the characters in line 614 of FIG. 6.

CONCLUSION

Although the subject matter has been described in language specific to structural features, languages, text directions, and/or methodological acts, it is to be understood that the subject matter defined in the appended claims is not necessarily limited to the specific features, languages, text directions, or acts described. Rather, the specific features, languages, text directions, and acts are disclosed as illustrative forms of implementing the claims.

What is claimed is:

1. A system comprising:
    one or more processors;
    computer-readable media coupled to the one or more processors;
    a character spacing module, stored in the computer-readable media and executed by the one or more processors, configured to determine, from a page image of text, a character spacing including (i) a trailing edge character spacing of an end-of-line character of a first line, the trailing edge character spacing corresponding to a first spacing between a trailing edge of the end-of-line character and an end-of-line edge of a character frame associated with the end-of-line character and (ii) a leading edge character spacing of a start-of-line character of a next line subsequent to the first line, the leading edge character spacing corresponding to a second spacing between a leading edge of the start-of-line character and a start-of-line edge of a character frame associated with the start-of-line character, the trailing edge character spacing separate from the leading edge character spacing;
    a character location module, stored in the computer-readable media and executed by the one or more processors, configured to identify characters that are not to be placed at a start of a line and characters that are not to be placed at an end of a line of text from the page image of text; and
    an alignment and reflow module, stored in the computer-readable media and executed by the one or more processors, configured to generate an initial layout of the text for display on an electronic display that maintains the character spacing from the page image of text between the end-of-line character and the start-of-line character when displayed on a same line of text.

2. The system of claim 1, wherein the character spacing module is configured to determine horizontal offsets and vertical offsets of characters in the page image of text from centers of character frames surrounding the characters in the page image of text.

3. The system of claim 1 further comprising an optical character recognition module, stored in the computer-readable media and executed by the one or more processors, configured to convert a scan of text into the page image of text.

4. The system of claim 1, wherein the character location module is configured to:
    identify locations to move the characters that are not to be placed at the start of the line from a line start or move the characters that are not to be placed at the end of the line from a line end; and
    instruct the alignment and reflow module to generate a regenerated layout of the text when the initial layout places characters that are not to be placed at the start of the line at the line start or places characters that are not to be placed at the end of the line at the line end.

5. The system of claim 1 further comprising a line start and line end character alignment module, stored in the computer-readable media and executed by the one or more processors, configured to align centers of characters that occupy an initial position in a line with each other and align centers of characters that occupy a final position in a line with each other.

6. The system of claim 1, wherein the alignment and reflow module is configured to calculate a number of character frames to be included in a line of text based at least in part on dimensions of the electronic display and a level of zoom associated with the electronic display.

7. A computer-implemented method comprising:
    under control of one or more computer systems configured with specific executable instructions,
    determining a character frame size, the character frame size based at least in part on at least one distance between centers of at least two full-width characters;
    calculating a first distance between a trailing edge of a final character in a line of characters and a trailing edge of a first character frame having the character frame size and surrounding the final character;
    calculating a second distance between a leading edge of an initial character in a next line of characters and a leading edge of a second character frame having the character frame size and surrounding the initial character, wherein the first distance is different than the second distance; and
    setting a spacing between the final character and the initial character as the sum of the first distance and the second distance for a layout in which the final character and the initial character are adjacent characters in a same line of characters.

8. The computer-implemented method of claim 7, further comprising determining an end-grid center line, wherein the end-grid center line passes through the final character and other final characters that occupy final positions of other lines and a location of the end-grid center line is based at least in part on locations of centers of the final character and the other final characters.

9. The computer-implemented method of claim 8, wherein a center of the first character frame surrounding the final character is aligned with the end-grid center line.

10. The computer-implemented method of claim 7, further comprising determining a start-grid center line, wherein the start-grid center line passes through the initial character and other initial characters that occupy initial positions of other lines and a location of the start-grid center line based at least in part on locations of centers of the initial character and the other initial characters.

11. The computer-implemented method of claim 10, wherein a center of the second character frame surrounding the initial character is aligned with the start-grid center line.

12. The computer-implemented method of claim 7, further comprising:
determining that the final character is a hanging punctuation character; and
aligning the first character frame surrounding the final character directly after a character frame surrounding a previous character in the same line as the final character.

13. The computer-implemented method of claim 12, wherein a center of the character frame surrounding the previous character is aligned with an end-grid center line, and wherein the end-grid center line passes through the previous character and other characters that occupy final positions of other lines and are not hanging punctuation.

14. The computer-implemented method of claim 7, further comprising generating a representation of the final character and the initial character adjacent to each other on the same line with spacing between the final character and the initial character as the sum of the first distance and the second distance.

15. One or more non-transitory computer-readable media storing computer-executable instructions that, when executed on one or more processors, cause a computing device to perform acts comprising:
identifying a character at a start of a line of text as a character that is not to be placed at the start of the line;
determining if the character that is not to be placed at the start of a line is hanging punctuation that may be hanged beyond an edge of a text bock frame;
when the character that is not to be paced at the start of the line is the hanging punctuation, moving the hanging punctuation to a location directly following an end of a previous line of text that is beyond the edge of the text bock frame and adjusting spacing between characters in the line of text in response to the moving of the character that is not to be placed at the start of the line; and
when the character that is not to be paced at the start of the line is not the hanging punctuation, moving a final character of the previous line, of text to the start of the line of text and adjusting spacing between characters in the previous line of text based as least in part on moving the final character.

16. The one or more non-transitory computer-readable media of claim 15, wherein identifying a character at the start of the line of text as the character that is not placed at the start of the line is based at least in part on optical character recognition and a list of characters that are not placed at the start of the line.

17. The one or more non-transitory computer-readable media of claim 15, wherein when the character that is not placed at the start of the line is the hanging punctuation, the adjusting spacing between characters in the line of text comprises:
aligning a first character in the line of text with a start-grid center line,
aligning a last character in the line of text with an end-grid center line, and
distributing other characters in the line of text between the first character and the last character.

18. The one or more non-transitory computer-readable media of claim 15, wherein when the character that is not placed at the start of the line is not the hanging punctuation, the adjusting spacing between characters in the previous line of text comprises:
aligning a first character in the previous line of text with a start-grid center line,
aligning a last character in the previous line of text with an end-grid center line, and
distributing other characters in the previous line of text between the first character and the last character.

19. The one or more non-transitory computer-readable media of claim 15, the acts further comprising:
identifying a character at an end of another line of text as a character that is not placed at an end of a line;
moving the character that is not placed at the end of the line to a start of a following line of text; and
adjusting spacing between characters in the following line of text based at least in part on moving the character that is not placed at the end of a line.

* * * * *